US007102071B2

(12) United States Patent
Tada

(10) Patent No.: US 7,102,071 B2
(45) Date of Patent: Sep. 5, 2006

(54) APPARATUS AND METHOD FOR PROCESSING TONE REPRODUCING DIGITAL DATA AGAINST UNAUTHORIZED USE

(75) Inventor: Yukio Tada, Iwata (JP)

(73) Assignee: Yamaha Corporation, (JP)

( * ) Notice: Subject to any disclaimer, the term of this patent is extended or adjusted under 35 U.S.C. 154(b) by 310 days.

(21) Appl. No.: 10/648,692

(22) Filed: Aug. 26, 2003

(65) Prior Publication Data

US 2004/0254908 A1     Dec. 16, 2004

(30) Foreign Application Priority Data

Aug. 28, 2002   (JP)   ............... 2002-249341

(51) Int. Cl.
    *A63H 5/00*   (2006.01)
    *G04B 13/00*   (2006.01)
(52) U.S. Cl. .......................................... 84/609; 705/52
(58) Field of Classification Search ............... 84/609, 84/645; 705/51, 52
    See application file for complete search history.

(56) References Cited

U.S. PATENT DOCUMENTS

| 5,864,868 | A | 1/1999 | Contois ...................... 707/104 |
| 5,902,948 | A | 5/1999 | Haruyama |
| 5,953,005 | A | 9/1999 | Liu ............................. 345/302 |
| 6,469,239 | B1 * | 10/2002 | Fukuda ......................... 84/602 |
| 6,548,747 | B1 | 4/2003 | Shibata et al. ................ 84/609 |
| 6,552,254 | B1 | 4/2003 | Hasegawa et al. |
| 6,620,993 | B1 | 9/2003 | Okamura et al. |
| 6,744,891 | B1 * | 6/2004 | Allen ......................... 380/231 |
| 6,884,933 | B1 * | 4/2005 | Akahori et al. ................ 84/609 |
| 6,928,261 | B1 | 8/2005 | Hasegawa et al. |
| 2002/0169722 | A1 | 11/2002 | Ando et al. |

FOREIGN PATENT DOCUMENTS

| JP | 10-69273 A | 3/1998 |
| JP | 11-212555 A | 8/1999 |
| JP | 2001-166772 A | 6/2001 |
| JP | 2001-343974 A | 12/2001 |
| JP | 2002-91458 A | 3/2002 |
| JP | 2002-140078 A | 5/2002 |
| JP | 2002-149166 A | 5/2002 |
| JP | 2002-162965 A | 6/2002 |
| JP | 2002-539487 A | 11/2002 |
| WO | WO 00/54453 A1 | 9/2000 |

OTHER PUBLICATIONS

Relevant portion of Japanese Office Action of corresponding Japanese Application No. 2002-249341.

* cited by examiner

*Primary Examiner*—Jeffrey W Donels
(74) *Attorney, Agent, or Firm*—Rossi, Kimms & McDowell LLP

(57) ABSTRACT

In response to a readout instruction, tone reproducing digital data are read out which include information indicative of tone generating events and time lengths. Then, degrading processing is performed to change the information indicative of tone generating events and time lengths, included in the read-out tone reproducing digital data, in accordance with payment of a necessary charge for the digital data, and then the changed tone reproducing digital data are output. By thus performing the degrading processing on the read-out tone reproducing digital data in accordance with the payment of the necessary charge when the digital data are to be transferred or reproduced, there can be achieved an advantageous effect of reliably preventing unauthorized use of the digital data.

20 Claims, 19 Drawing Sheets

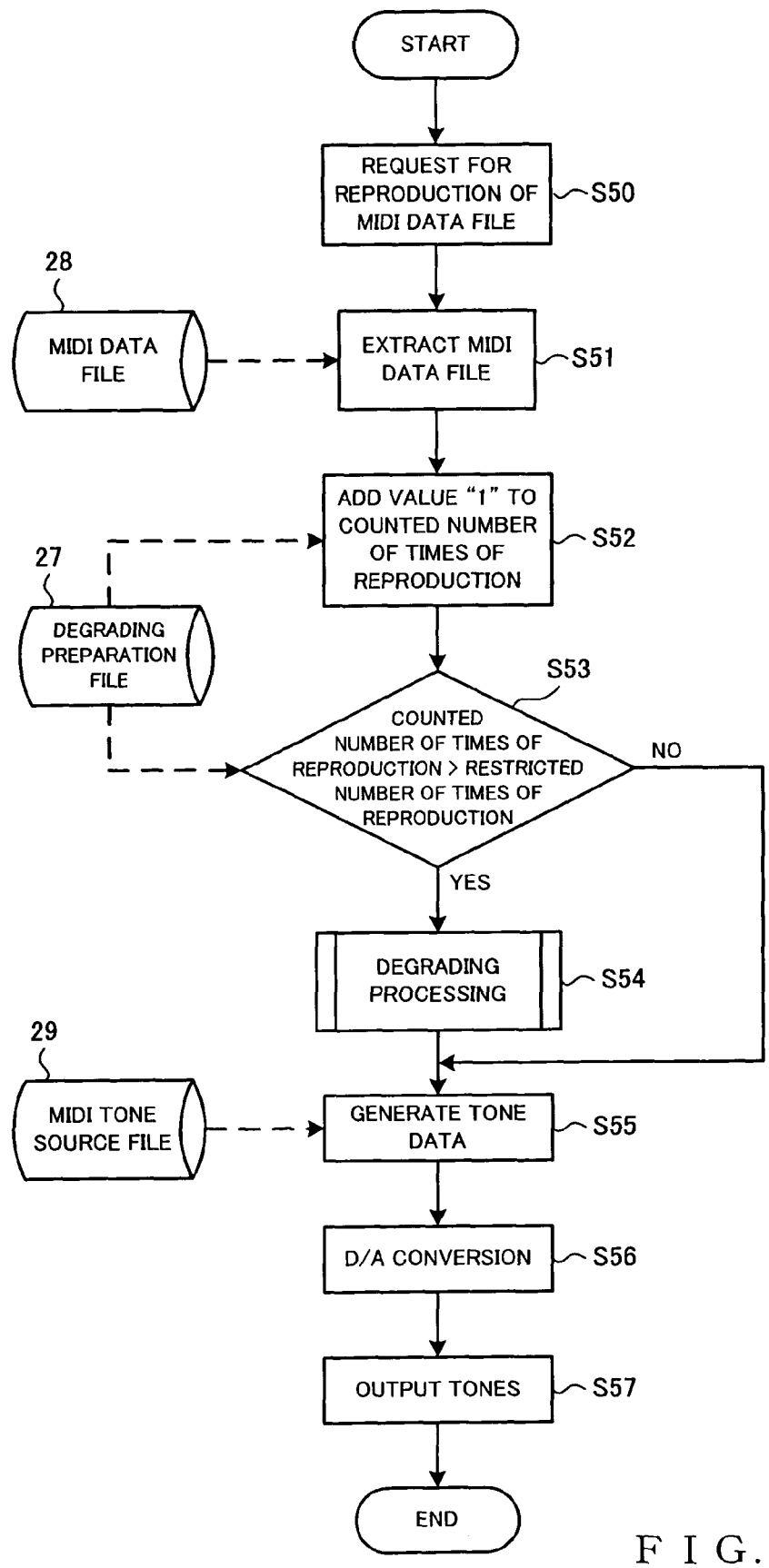
F I G. 8

SERVER : CHARGE PAYMENT FILE

| USER ID | MIDI DATA FILE NO. | PAYMENT SIGN |
|---|---|---|
| ⋮ | ⋮ | ⋮ |
| AAAAA | 11111 | 2 |
| AAAAA | 12221 | 1 |
| AAAAA | 21211 | 0 |
| BBBBB | 11111 | 1 |
| BBBBB | 12221 | 2 |
| BBBBB | 21211 | 1 |
| CCCCC | 11111 | 0 |
| CCCCC | 12221 | 0 |
| CCCCC | 21211 | 0 |
| ⋮ | ⋮ | ⋮ |

FIG. 15

DEGRADING CONDITION FILE

| PAYMENT SING | RESTRICTED NUMBER OF TIMES OF COPYING | RESTRICTED NUMBER OF TIMES OF REPRODUCTION | DEGREE OF DEGRANING |
|---|---|---|---|
| | | | NUMBER OF WEAK-IMPRESSION DATA TO BE CHANGED |
| 0 | 0 | 0 | 45 |
| 1 | 5 | 50 | 30 |
| 2 | 10 | 100 | 0 |

FIG. 16

USER TERMINAL : DEGRADING PREPARATION FILE

| MIDI DATA FILE NO. | COUNTED NUMBER OF TIMES OF REPRODUCTION | COUNTED NUMBER OF TIMES OF COPYING |
|---|---|---|
| ⋮ | ⋮ | ⋮ |
| 11111 | 10 | 1 |
| 12221 | 20 | 2 |
| 21211 | 5 | 6 |
| ⋮ | ⋮ | ⋮ |

USER TERMINAL : RESTRICTED-NUMBER-OF-TIME FILE

| CONDITION OF NUMBER OF TIMES OF COPYING | $0 \leq$ COUNTED NUMBER OF TIMES OF COPYING $\leq$ RESTRICTED NUMBER OF TIMES OF COPYING | RESTRICTED NUMBER OF TIMES OF COPYING < COUNTED NUMBER OF TIMES COPYING $\leq$ RESTRICTED NUMBER OF TIMES OF COPYING + 5 | RESTRICTED NUMBER OF TIMES OF COPYING + 5 < COUNTED NUMBER OF TIMES OF COPYING |
|---|---|---|---|
| CONDITION OF NUMBER OF TIMES OF REPRODUCTION | $0 \leq$ COUNTED NUMBER OF TIMES OF REPRODUCTION $\leq$ RESTRICTED NUMBER OF TIMES OF REPRODUCTION | RESTRICTED NUMBER OF TIMES OF REPRODUCTION < COUNTED NUMBER OF TIMES OF REPRODUCTION $\leq$ RESTRICTED NUMBER OF TIMES OF REPRODUCTION + 25 | RESTRICTED NUMBER OF TIMES OF REPRODUCTION + 25 < COUNTED NUMBER OF TIMES OF REPRODUCTION |
| DEGREE OF DEGRADING | NUMBER OF WEAK-IMPRESSION DATA TO BE CHANGED | 0 | 30 | 45 |

DEGRADING CONDITION FILE

| PAYMENT SING | DEGREE OF DEGRADING | | |
|---|---|---|---|
| | QUANTIZING RATIO | TONE COLOR CHANGING RATIO | RATIO OF WEAK-IMPRESSION DATA TO BE CHANGED |
| 0 | 20 | 20 | 45 |
| 1 | 10 | 10 | 30 |
| 2 | 0 | 0 | 0 |

FIG. 19

DELTA TIME SETTING FILE

| REFERENCE DELTA TIME VALUE | NOTE |
|---|---|
| 1920 | WHOLE NOTE |
| 1440 | DOTTED HALF NOTE |
| 960 | HALF NOTE |
| 720 | DOTTED QUARTER NOTE |
| 480 | QUARTER NOTE |
| 360 | DOTTED EIGHTH NOTE |
| 240 | EIGHTH NOTE |
| 180 | DOTTED SIXTEENTH NOTE |
| 120 | SIXTEEN NOTE |
| 90 | DOTTED THIRTY-SECOND NOTE |
| 60 | THIRTY SECOND NOTE |

FIG. 20

TONE COLOR SETTING FILE

| TONE COLOR GROUP | PROGRAM NO. | REPLACING PROGRAM NO. |
|---|---|---|
| ⋮ | ⋮ | ⋮ |
| TRUMPET | 11 | 12 |
| | 12 | 13 |
| | 13 | 14 |
| | 14 | 15 |
| | 15 | 11 |
| | ⋮ | ⋮ |
| PIANO | 100 | 101 |
| | 101 | 102 |
| | ⋮ | ⋮ |

FIG. 21

APPARATUS AND METHOD FOR PROCESSING TONE REPRODUCING DIGITAL DATA AGAINST UNAUTHORIZED USE

BACKGROUND OF THE INVENTION

The present invention relates to a technique for intentionally degrading tone reproducing digital data, such as those of the MIDI (Musical Instrument Digital Interface) format, to cope with unauthorized use of the digital data when the digital data are transmitted via a wireless or wired transmission path, reproduced or copied.

To date, there have been developed various systems which allow tone reproducing digital data, such as those of the MIDI format, to be downloaded, via communication networks like the Internet, from servers to portable phones, personal computers, karaoke devices, etc. Generally, in these systems, data providers etc., each including a server computer, present users with charges for tone reproducing digital data to be provided, and tone reproducing digital data are delivered or sold from the server to a user terminal that has paid a predetermined charge.

Further, by virtue of short-range communication techniques known today, such as the "IrDA" and "Bluetooth" techniques, tone reproducing digital data, such as those of incoming-call signaling melodies (ring melodies), can also be communicated directly between portable phones without intervention of a server. Such tone reproducing digital data can be transmitted with an almost 100% reproducibility because of the digital nature. Thus, if the tone reproducing digital data are communicated between portable phones, the data, practically equal in data quality to the corresponding chargeable regular content sold through a regular route, may be copied free of charge. Therefore, in such cases, the data provider is unable to collect the charge for the tone reproducing digital data, which can be very great damage to the data providers. Further, copying of the tone reproducing digital data free of charge may constitute infringement on the copyright of the data.

SUMMARY OF THE INVENTION

In view of the foregoing, it is an object of the present invention to provide an information processing apparatus and method which can achieve an advantageous effect of preventing unauthorized use of tone reproducing digital data, such as those of the MIDI (Musical Instrument Digital Interface) format, when the data are transmitted, reproduced or copied, by performing intentional degrading processing on the digital data in accordance with payment of a necessary charge for the data.

In order to accomplish the above-mentioned object, the present invention provides an information processing apparatus, which comprises: a storage section storing tone reproducing digital data including information indicative of notes to be sounded and tone generating time lengths of the notes; a readout section that, in response to a readout instruction, reads out the tone reproducing digital data from the storage section; a note extraction section that extracts, from among the read-out tone reproducing digital data, notes meeting a predetermined condition; a data change section that changes the information indicative of the tone generating time lengths of the extracted notes, to thereby perform a quantizing process on the notes; and an output section that reproduces or outputs, to external equipment, the tone reproducing digital data having been changed by the data change section.

The information processing apparatus may be any one of a server, personal computer, portable phone, PDA (Personal Digital Assistant), PHS (Personal Handy-phone System), karaoke device, etc. Namely, once an instruction for reading out tone reproducing digital data is given, the information processing apparatus reads out the tone reproducing digital data and extracts, from among the read-out tone reproducing digital data, notes meeting a predetermined condition. Then, the information processing apparatus changes the information, indicative of the tone generating time lengths of the extracted notes, to thereby perform a quantizing process on the notes, and outputs the thus-changed tone reproducing digital data.

The present invention also provides an information processing apparatus, which comprises: a storage section storing tone reproducing digital data including information indicative of notes to be sounded and a tone color of the notes; a readout section that, in response to a readout instruction, reads out the tone reproducing digital data from the storage section; a note extraction section that extracts, from among the read-out tone reproducing digital data, notes meeting a predetermined condition; a data change section that changes the information indicative of the extracted tone color of the notes; and an output section that reproduces or outputs, to external equipment, the tone reproducing digital data having been changed by the data change section.

Namely, once an instruction for reading out tone reproducing digital data is given, the information processing apparatus of the invention reads out the tone reproducing digital data and extracts, from among the read-out tone reproducing digital data, notes meeting a predetermined condition. Then, the information processing apparatus changes the information indicative of the tone color of the extracted notes, to thereby output the thus-changed tone reproducing digital data.

The present invention also provides an information processing apparatus, which comprises: a storage section storing tone reproducing digital data including information indicative of tone generating intensity levels and tone generating time lengths of notes to be sounded; a readout section that, in response to a readout instruction, reads out the tone reproducing digital data from the storage section; a note extraction section that extracts, from among the tone read-out reproducing digital data, notes meeting a predetermined condition regarding either or both of the tone generating intensity level and tone generating time length; a data change section that deletes the extracted notes; and an output section that reproduces or outputs, to external equipment, the tone reproducing digital data having the extracted notes deleted therefrom by the data change section.

Namely, once an instruction for reading out tone reproducing digital data is given, the information processing apparatus of the invention reads out the tone reproducing digital data and extracts, from among the read-out tone reproducing digital data, notes meeting a predetermined condition. Then, the information processing apparatus deletes the extracted notes, to thereby output the tone reproducing digital data from which the extracted notes have been deleted therefrom.

The present invention also provides an information processing apparatus, which comprises: a storage section storing tone reproducing digital data including information indicative of tone generating intensity levels and tone generating time lengths of notes to be sounded; a readout section that, in response to a readout instruction, reads out the tone reproducing digital data from the storage section; a data change section that changes the read-out tone reproducing digital data, by adding new tone generating events to the digital data on the basis of a predetermined algorithm; and an output section that reproduces or outputs, to external equipment, the tone reproducing digital data having the new tone generating events added thereto by the data change section.

Namely, once an instruction for reading out tone reproducing digital data is given, the information processing apparatus of the invention reads out the tone reproducing digital data and extracts, from among the read-out tone reproducing digital data, notes meeting a predetermined condition. Then, the information processing apparatus changes the read-out tone reproducing digital data by adding new tone generating events to the digital data on the basis of a predetermined algorithm, to thereby output the tone reproducing digital data to which the new tone generating events have been added.

In a preferred embodiment, the information processing apparatus further comprises: a counter section that counts a number of times the tone generating digital data are read out from the storage section, and a determination section that, on the basis of the number of times counted by the counter section, determines whether or not a change process should be performed on the read-out tone reproducing digital data.

In a preferred embodiment, the information processing apparatus further comprises: a payment information storage section that stores payment information indicative of payment made by a user for a necessary charge; and a determination section that, on the basis of the payment information stored in the payment information storage section, determines degree of a change to be made by the data change section to the tone reproducing digital data.

In a preferred embodiment, the information processing apparatus further comprises: a history information storage section that stores change history information including information indicative of contents of a change made by the data change section to the tone reproducing digital data; and a restoration section that, on the basis of the change history information stored in the history information storage section, restores the changed tone reproducing digital data to the original tone reproducing digital data.

In a preferred embodiment, the information processing apparatus further comprises: a history addition section that adds, to the tone reproducing digital data, change history information including information indicative of contents of a change made by the data change section to the tone reproducing digital data; and a restoration section that, on the basis of the change history information included in the tone reproducing digital data, restores the changed tone reproducing digital data to the original tone reproducing digital data.

According to another aspect of the present invention, there is provided an information processing method for use in an information communication network including a server of a data provider and a user terminal that receives tone reproducing digital data from the server. According to the information processing method, the server performs: a step of prestoring payment information indicative of payment to be made by the user terminal for tone reproducing digital data; a step of receiving, from the user terminal, a request for supply of tone reproducing digital data; a step of reading out the tone reproducing digital data designated by the received request for supply; a step of, on the basis of the payment information of the tone read-out reproducing digital data, determining whether or not a change process should be performed on the read-out tone reproducing digital data; a step of, when it is determined that the change process should be performed, performing the change process on the read-out tone reproducing digital data, and outputting the tone reproducing digital data having been subjected to the change process; and a step of transmitting the outputted tone reproducing digital data.

According to another aspect of the present invention, there is provided an information processing method for use in an information communication network including a server of a data provider and a user terminal that receives tone reproducing digital data from the server, according to which the server performs: a step of prestoring payment information indicative of payment to be made by the user terminal for tone reproducing digital data and storing readout restriction information corresponding to the payment information; a step of receiving, from the user terminal, a request for supply of tone reproducing digital data; a step of reading out the tone reproducing digital data designated by the received request for supply; a step of adding, to the read-out tone reproducing digital data, the readout restriction information corresponding to the payment information of the read-out tone reproducing digital data; a step of outputting the read-out tone reproducing digital data; and a step of transmitting the outputted tone reproducing digital data to the user terminal. Here, the user terminal performs: a step of receiving the tone reproducing digital data transmitted by the server; a step of storing the received tone reproducing digital data; a step of detecting a request made by a user for readout of tone reproducing digital data; a step of reading out the tone reproducing digital data designated by the detected request; a step of, on the basis of the readout restriction information of the read-out tone reproducing digital data, determining whether or not a change process should be performed on the read-out tone reproducing digital data; and a step of, when it is determined that the change process should be performed, performing the change process on the read-out tone reproducing digital data, and outputting the tone reproducing digital data having been subjected to the change process.

The present invention may be constructed and implemented not only as the apparatus invention as discussed above but also as a method invention. Also, the present invention may be arranged and implemented as a software program for execution by a processor such as a computer or DSP, as well as a storage medium storing such a software program. Further, the processor used in the present invention may comprise a dedicated processor with dedicated logic built in hardware, not to mention a computer or other general-purpose type processor capable of running a desired software program.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the object and other features of the present invention, its preferred embodiments will be described hereinbelow in greater detail with reference to the accompanying drawings, in which:

FIG. 8 is a flow chart explanatory of the degrading processing performed in the embodiment of FIG. 1;

FIG. 15 is a diagram showing an exemplary data organization of a charge payment file employed in the present invention;

FIG. 16 is a diagram showing an exemplary data organization of a degrading condition file employed in the present invention;

FIG. 17 is a diagram showing an exemplary data organization of a degrading preparation file employed in a modified embodiment of the present invention;

FIG. 18 is a diagram showing an exemplary data organization of a restricted-number-of-times file employed in the modified embodiment of FIG. 9;

FIG. 19 is a diagram showing an exemplary data organization of a degrading condition file employed in another embodiment of the present invention;

FIG. 20 is a diagram showing an exemplary data organization of a delta time setting file employed in the embodiment; and FIG. 21 is a diagram showing an exemplary data organization of a tone color setting file employed in the embodiment.

DETAILED DESCRIPTION OF EMBODIMENT

Various embodiments of the present invention will be described below in relation to a case where tone reproducing digital data processed by the invention are in the form of MIDI data files of the SMF (Standard MIDI File) standard, although the tone reproducing digital data may be in any other suitable format.

Figure 1:
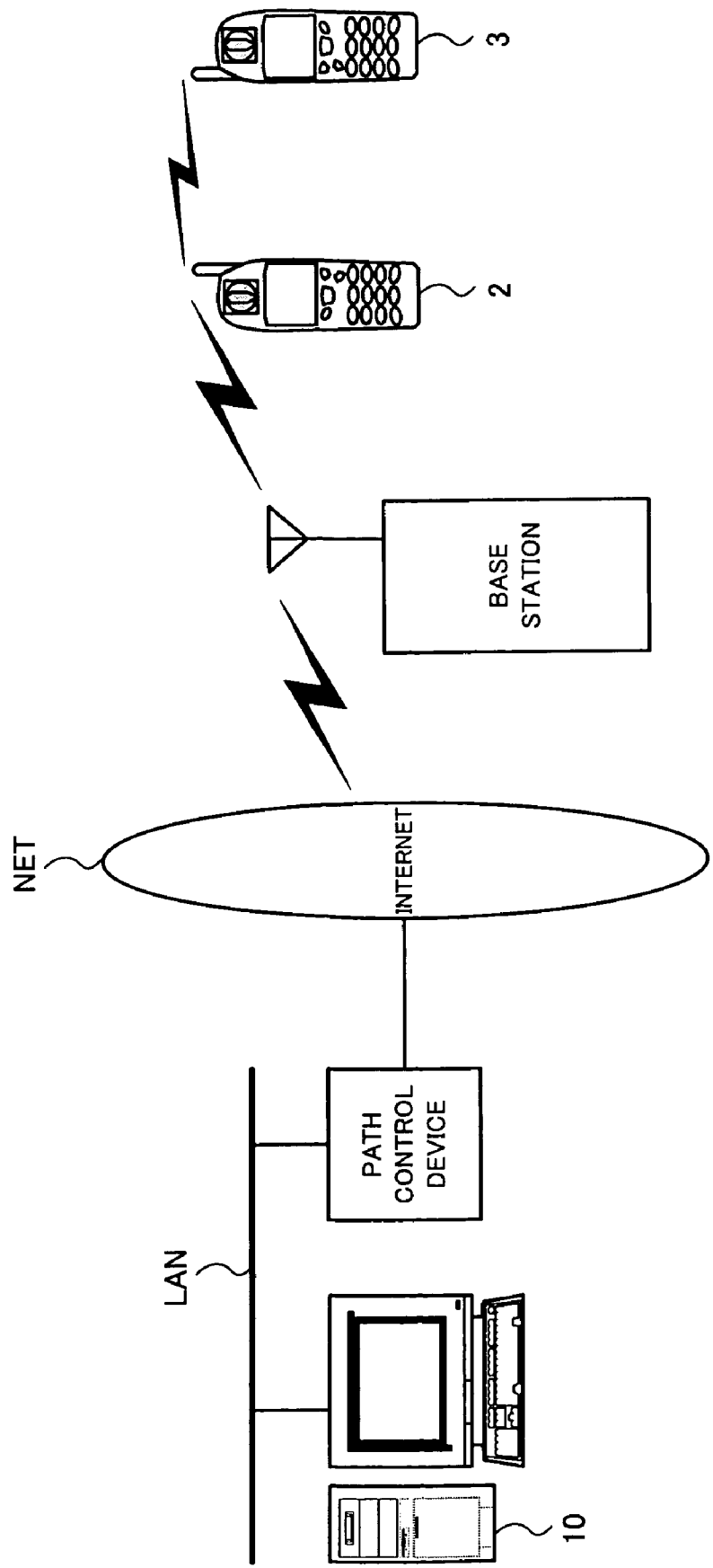
FIG. 1 is a block diagram showing a general setup of a system in accordance with an embodiment of the present invention.

1. First Embodiment (1) Setup:

① General Setup:

FIG. 1 is a block diagram showing an example general setup of a system in accordance with a first embodiment of the present invention. In the figure, reference numeral 10 represents a server that is connected to the Internet NET via a communication path control device and telephone line, and 2 and 3 represent portable phones that are user terminals connected to the Internet via a base station. The user terminals 2 and 3 each include a control section, such as a keyboard panel, having push buttons and switches. Although the system normally includes a multiplicity of user terminals, it is shown and described as including only two user terminals 2, 3 for convenience of description.

Various processes performed in the instant embodiment are outlined below. When a MIDI data file is to be transmitted to any one of the user terminals 2 via the Internet NET, the server 10 first carries out degrading processing on the MIDI data file in accordance with an amount of money paid by a user of the user terminal 2. If a high charge has been paid, no degrading processing is carried out, but if a low charge has been paid, degrading processing of low degree is carried out. Further, if the necessary charge has not been paid at all, degrading processing of high degree is carried out. Specifically, the degrading processing is performed in the instant embodiment in accordance with payment management information indicated by payment information file managed by the server 10. Note that the payment or settlement of necessary charges may be by any of advance payment, subsequent payment, credit card, electronic money, etc. The term "paid" as used in the following descriptions means a situation where settlement has actually been made for a necessary charge or settlement for a necessary charge has been promised or agreed to by a user; thus, in the case of subsequent payment or settlement by credit card, it is possible that actual payment has not yet been completed prior to delivery of requested tone reproducing digital data.

The "degrading processing" performed in the instant embodiment is intended to intentionally degrade the quality of an original MIDI data file. Payment of a necessary charge is effective only for one downloading. Namely, even when a necessary charge has been paid for downloading of a MIDI data file, if the charge is not again paid for further downloading of the MIDI data file, the degrading processing is carried out just as in the case where no payment is made at all.

Some limitations or restrictions are also imposed when a MIDI data file is reproduced at the user terminal 2 or copied from the user terminal 2 to another user terminal 3. The limitations or restrictions include one on the number of times of reproduction and the number of times of copying. According to the limitation on the number of times of reproduction, the MIDI data file downloaded from the server 10 is allowed to be reproduced with the original quality up to a predetermined maximum permissible number of times (i.e., restricted number of times); however, once the predetermined maximum permissible number of times (restricted number of times of reproduction) is exceeded, the degrading processing is carried out to allow the MIDI data file to be reproduced only with degraded quality. Similarly, according to the limitation on the number of times of copying, the MIDI data file downloaded from the server 10 is allowed to be copied with the original quality up to a predetermined maximum permissible number of times (restricted number of times of copying); however, once the predetermined maximum permissible number of times (restricted number of times of copying) is exceeded, the degrading processing is carried out to allow the MIDI data file to be copied only with degraded quality.

If the restricted number of times of copying is exceeded by the user terminal 2 transmitting the downloaded MIDI data file to another user terminal 3, the degrading processing is performed on the MIDI data file to be transmitted to the other user terminal 3. At that time, the degrading processing may also be performed on the MIDI data file stored in the user terminal 2.

Similarly, if the restricted number of times of reproduction is exceeded by the user terminal 2 reproducing the MIDI data file, the degrading processing may be performed on the MIDI data file stored in the user terminal 2.

(MIDI Data File)

Figure 4:
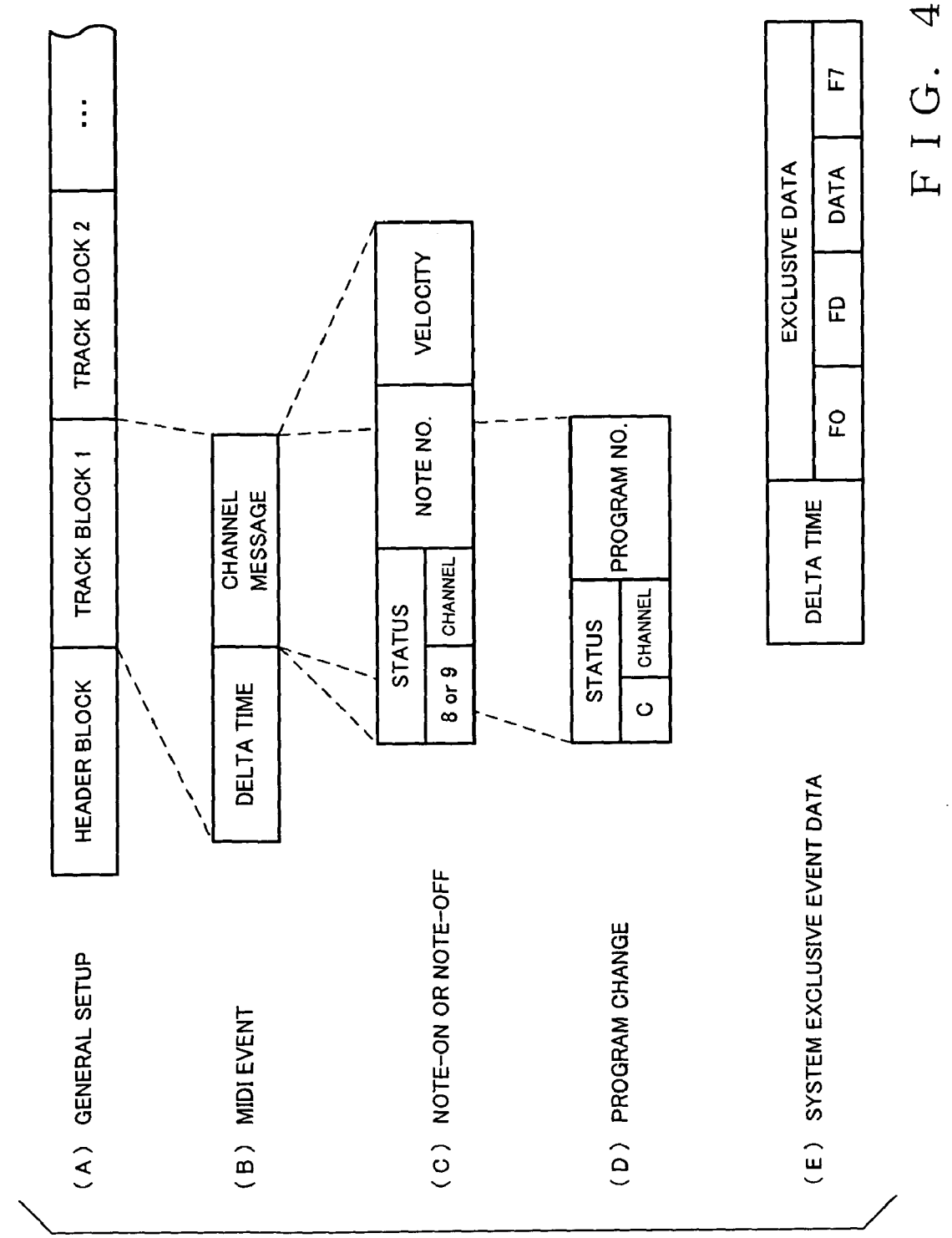
FIG. 4 is a diagram showing an organization of a MIDI data file employed in the embodiment of FIG. 1.
Figure 5:
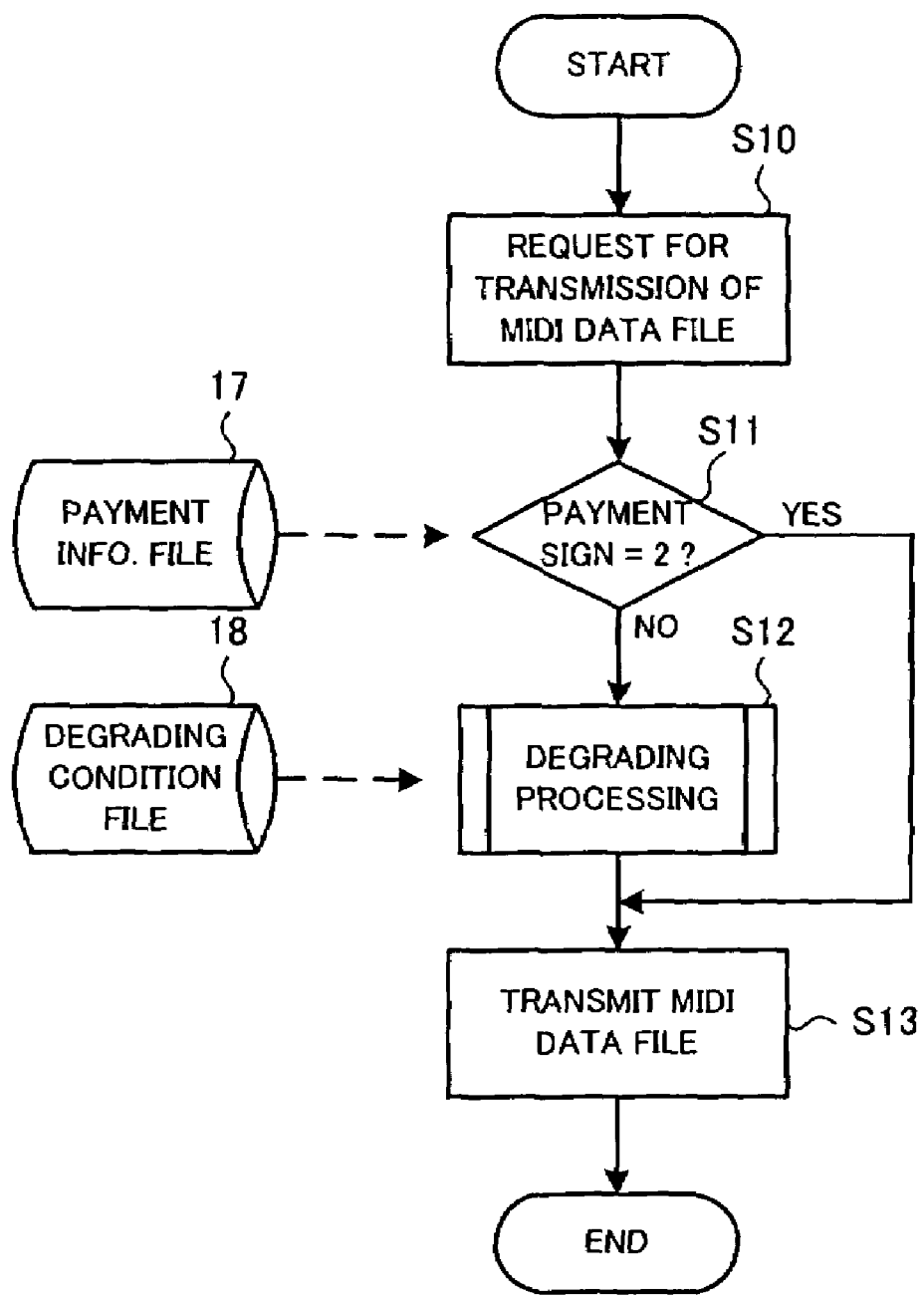
FIG. 5 is a flow chart explanatory of degrading processing performed in the embodiment of FIG. 1.

The following paragraphs explain a MIDI data file processed in the embodiment, with reference to FIG. 4.

As illustrated in section (A) of FIG. 4, each MIDI data file handled in the instant embodiment comprises two types of data blocks: header block; and track block. The MIDI data file begins with the header block, which is followed by one or more track blocks. The header block has various pieces of information, such as settings specific to the file, stored therein, and each of the track blocks has performance information specific to the track and other information accompanying the performance information.

More specifically, in the header block, there are stored, in addition to prescribed values of a block type and data length, a format type, number of tracks and time unit information. The time unit information is represented by a delta time or tone generating time length (duration) of a quarter note.

In each of the track blocks, there are stored three types of data: MIDI event data constituting performance information of the MIDI format; system exclusive event data, such as an exclusive message that is a parameter specific to a maker or equipment; and meta event data other than performance information, such as file number data.

The instant embodiment will be described in relation to the MIDI event data because the degrading processing is performed on the MIDI event data.

As illustrated in section (B) of FIG. 4, each of the MIDI event data in the track block comprises a delta time and channel message. The delta time represents a tone generating time or duration of a tone, which is indicated as a variable time length in accordance with the time unit information of the header block; specifically, the delta time is indicated as a time difference from preceding MIDI event data.

The channel message is a message specific to a channel, which is any one of a plurality of types of messages, such as a note-on message instructing generation of a tone, note-off message instructing deadening (silencing) of a generated tone and a program change designating a tone color or instructing a changeover of one tone color to another.

Only those messages pertinent to the instant embodiment are described below.

As illustrated in section (C) of FIG. 4, the note-on message includes status data indicative of its status by value "9" and channel number, data indicative of a note number designating a scale note name, such as C, D or E, and data indicative of velocity designating degree of strength or weakness of a tone. Similarly, the note-off message includes status data indicative of its status by value "8" and channel number, and data indicative of a note number and velocity.

As further illustrated in section (D) of FIG. 4, the program change includes status data indicative of its status by "C" and channel number, and data indicative of a program number designating a tone color, such as that of a piano or violin.

Because the instant embodiment is arranged to store a restricted number of times of reproduction and restricted number of times of copying of a MIDI data file, the system exclusive event data is also explained here. The system exclusive event data includes data indicative of a delta time and an exclusive message. As illustrated in section (E) of FIG. 4, the exclusive message includes status data "F0", end-of-exclusive (EOX) status data "F7", and other necessary data provided between the status data "F0" and the end-of-exclusive (EOX) status data. In the instant embodiment, the other necessary data include data indicative of the restricted number of times of reproduction and restricted number of times of copying of the MIDI data file in question. These information may be stored in predetermined encrypted form.

Figure 2:
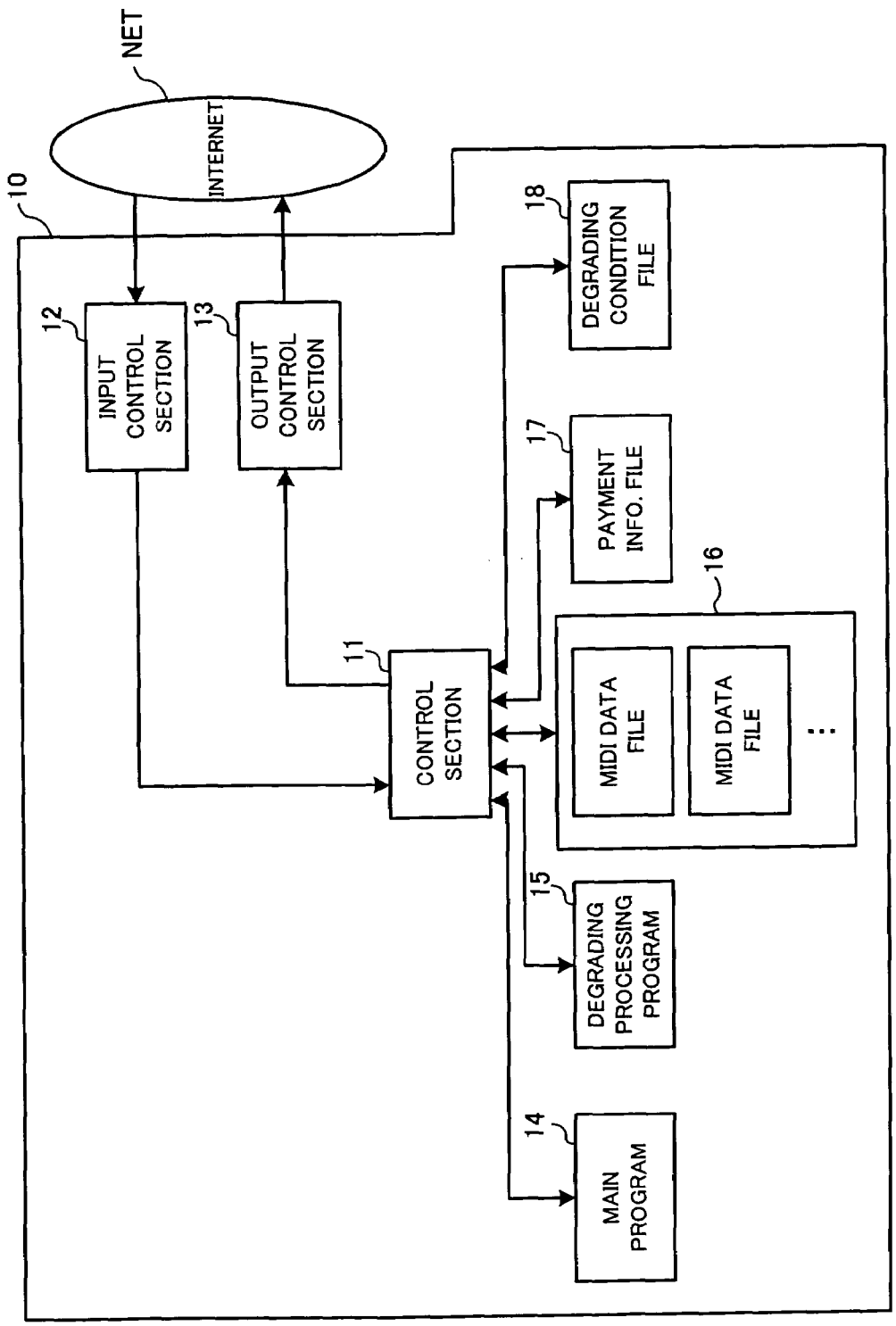
FIG. 2 is a block diagram showing a structure of a server in the embodiment of FIG. 1.

② Structure of the Server:

Next, a specific structure of the server 10 is described, with reference to a block diagram of FIG. 2. In the figure, reference numeral 11 represents a control section comprising, for example, a CPU, which controls various components of the server 10, transmits various data, performs various arithmetic operations and temporarily stores various data in memory. Reference numeral 12 represents an input control section, which controls data received from the user terminal 2 connected to the server 10 via the Internet NET. Reference numeral 13 represents an output control section, which controls data to be output to the user terminal 2 connected to the server 10 via the Internet NET. Reference numerals 14–18 represent storage sections, in which files to be described below are stored.

In the storage section 14, there is prestored a main program for use in the control section 11. The main program includes a program for displaying a predetermined screen on a display section of any of the user terminals, program for transmitting a predetermined MIDI data file to any of the user terminals.

In the storage section 15, there is prestored a degrading program for use in the control section 11. The degrading program is intended to intentionally degrade the data quality of a predetermined MIDI data file.

In the storage section 16, there are prestored MIDI data files, each of which includes performance data, file number data identifying the MIDI data file, etc.

In the storage section 17, there is stored a charge payment information file that covers every MIDI file to be transmitted and every user. As shown in FIG. 15, charge payment signs are stored in the charge payment information file along with user IDs and file number data. The charge payment signs each represent a payment level corresponding to an amount paid by a user. In the instant embodiment, charge payment sign "2" is stored if a high charge has been paid, charge payment sign "1" is stored if a low charge has been paid, and charge payment sign "0" is stored if the charge has not been paid at all.

In the storage section 18, there is stored a degrading condition file. The degrading condition file stores information on degrading conditions preset in correspondence with the charge payment signs. The degrading conditions are conditions for performing the degrading processing to intentionally degrade the quality of an original MIDI data file. FIG. 16 illustrates degrading conditions included in the degrading condition file; as shown, the degrading conditions comprise the charge payment sign, restricted number of times of copying, restricted number of times of reproduction and degree of degradation.

Here, the degree of degradation indicates a particular degree of the degrading processing. In the instant embodiment, the degrading processing is arranged to delete those note data in a MIDI data file of which a product between values of the delta time and velocity is small (i.e., a tone generating time is short and a generated tone is weak in intensity), because these note data give a relatively small impression (these data will therefore be called "weak-impression note data"). Therefore, in the instant embodiment, the degree of degradation indicates a specific number of note data to be deleted (number of to-be-changed weak-impression note data) in the degrading processing.

In the instant embodiment, if a high charge has been paid by a user, a great restricted number (i.e., great maximum permissible number) of times of copying and great restricted number (i.e., great maximum permissible number) of times of reproduction are stored or set for the user, and the number of weak-impression note data to be deleted is set to zero ("0"). If a low charge has been paid by a user, a small restricted number of times of copying and small restricted number of times of reproduction are stored or set for the user, and the number of weak-impression note data to be deleted is set to a small value greater than zero. Further, if the charge has not been paid at all by a user, the restricted number of times of copying and great restricted number of times of reproduction are set to zero ("0") for the user, and a great number of weak-impression note data to be deleted is set.

Figure 3:
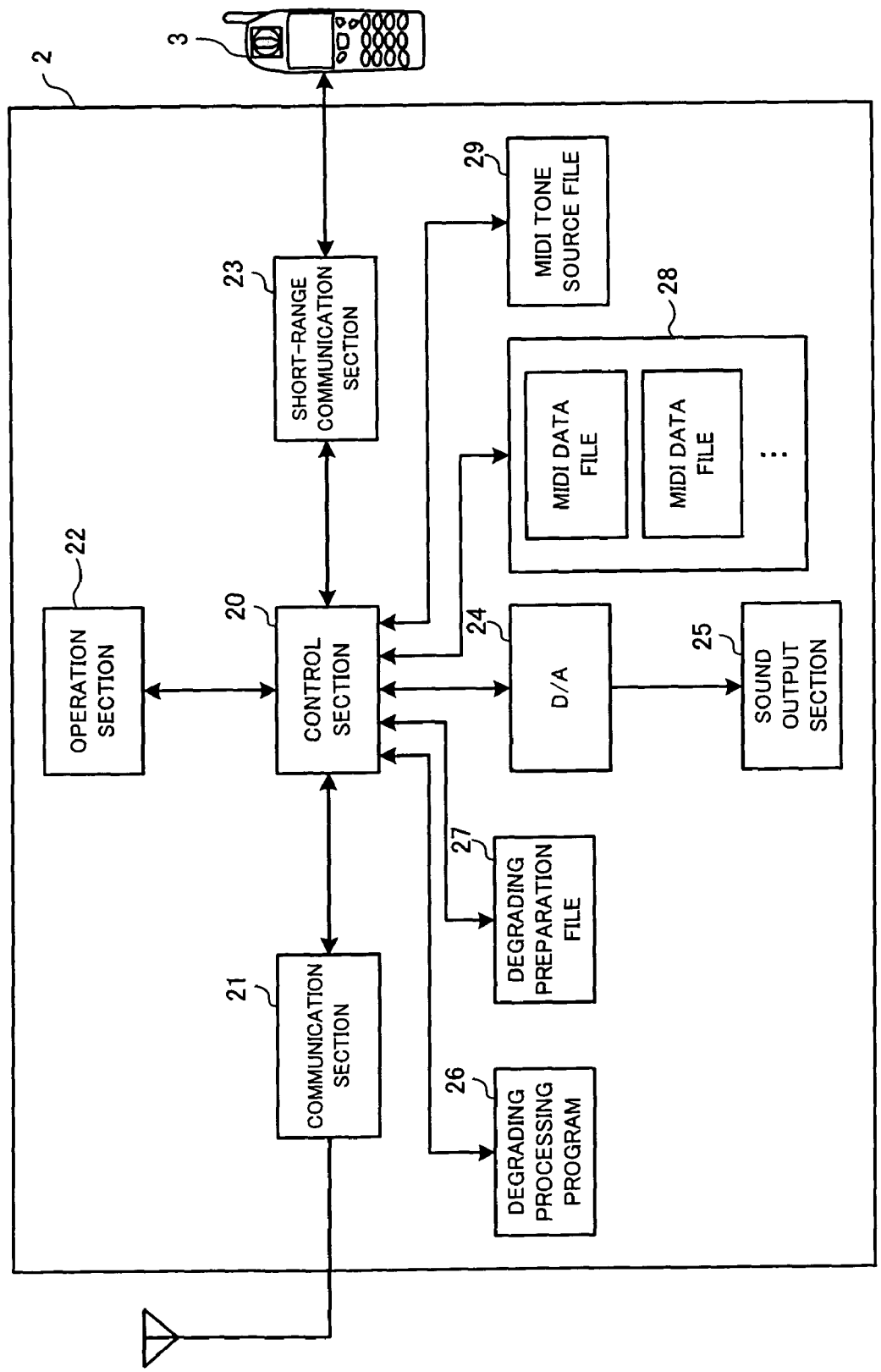
FIG. 3 is a block diagram showing an internal structure of a user terminal in the embodiment of FIG. 1.

③ Structure of the User Terminal:

Internal structure of the user terminal 2 is described below with reference to FIG. 3. In the figure, reference numeral 22 represents an operation section including, for example, a keyboard panel where numerical buttons etc. are provided. Reference numeral 21 represents a communication (transmission/reception) section for transmitting/receiving sound signals via a base station. 23 represents a short-range communication section that has a short-range communication function based, for example, on the "IrDA" or "Bluetooth" (registered trademark) and performs short-distance data communication. 20 represents a control section comprising, for example, a CPU, which controls various components of the user terminal 2, transmits various data, performs various arithmetic operations and temporarily stores various data in memory. 24 represents a D/A converter section for converting each digital tone data, generated in accordance with a MIDI data file, into analog representation. 25 represents a sound output section for outputting the tone data having been subjected to the D/A conversion. Further, reference numerals 26–29 represent storage sections, in which files to be described below are stored.

In the storage section 26, there is prestored a degrading program for use in the control section 20. The degrading program is intended to intentionally degrade the data quality of a predetermined MIDI data file.

In the storage section 27, there is stored a degrading preparation file, which covers every MIDI data file. As illustrated in FIG. 17, the degrading preparation file includes MIDI data file numbers, and corresponding numbers of times of reproduction and numbers of times of copying. In an initial state, the number of times of reproduction and the number of times of copying are each set to zero.

In the storage section 28, there are stored MIDI data files, each of which includes performance data, file number data identifying the MIDI data file, etc.

Further, in the storage section 29, there is stored a MIDI tone source file, which includes tone source data of tones corresponding to note numbers and tone colors, i.e. program numbers, described in MIDI data files.

Note that the MIDI tone source may be any of various tone sources, such as the PCM, FM and physical model tone sources.

(2) Behavior:

The following paragraphs describe behavior of the instant embodiment.

① Behavior of the Server:

First, a description is given about how a MIDI data file is degraded on the basis of charge payment information when the MIDI data file is to be transmitted from the server to the user terminal.

Once the user terminal 2 accesses the server 10, the control section 11 of the server 10 detects the access via the input control section 12.

Then, when the user terminal 2 has made a request for transmission of a predetermined MIDI data file at step S10, the control section 11 refers to the charge payment sign in accordance with the user ID of the user terminal 2 and file number of the data file to be transmitted included in the charge payment information file 17, at step S11. If the charge payment sign is "2", the requested MIDI data file is transmitted as it is (i.e., without data quality degradation) to the user terminal 2 via the output control section 13 in accordance with the main program, at step S13. If the charge payment sign is "0" or "1", the degrading processing is performed on the MIDI data file in accordance with the degrading processing program and on the basis of the information included in the degrading condition file 18, so that a new MIDI data file is created (step S12). Then, the control section 11 transmits the MIDI data file, newly created through the degrading processing, to the user terminal 2 via the output control section 13 in accordance with the main program, at step S13.

In turn, the user terminal 2 stores the MIDI data file, transmitted from the server in its storage section 28.

(MIDI Data File Degrading Processing)

Here, the degrading processing carried out at step S12 is described in detail.

Figure 6:
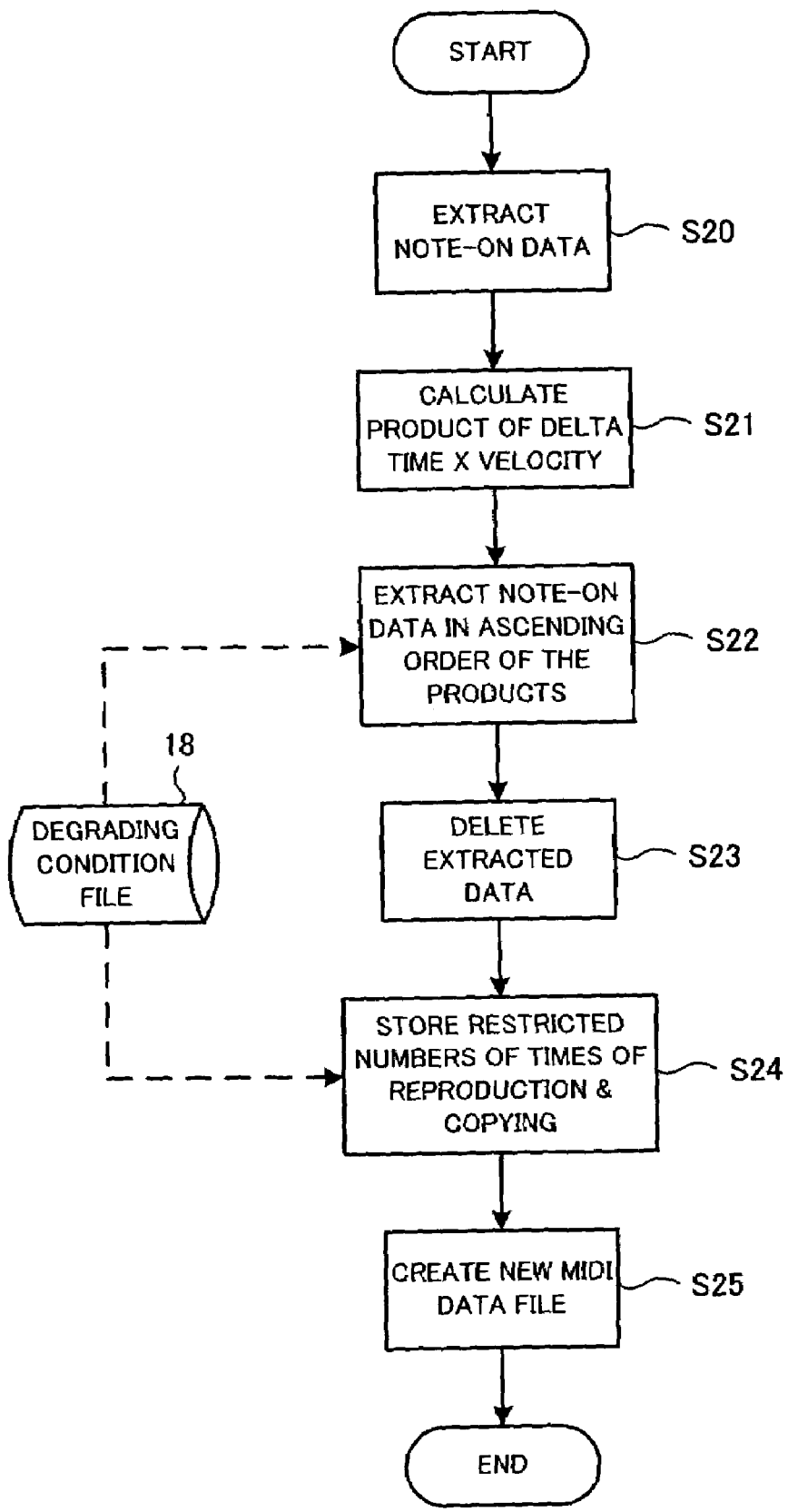
FIG. 6 is a flow chart explanatory of the degrading processing performed in the embodiment of FIG. 1.

As illustrated in FIG. 6, the MIDI data file to be subjected to the degrading processing is temporarily read out to the control section 11, from which note-on data, i.e. data having a status of "9n", of the channel messages of the MIDI event data are extracted (step S20). Then, for each of the extracted note-on data, a product between the delta time corresponding to the note-on data and the velocity is calculated at step S21. In this way, a predetermined number of note-on data are extracted from the MIDI data file in ascending order of the products, at step S22. Specifically, the predetermined number of note-on data are extracted from the MIDI data file, with reference to the degree of degradation (the number of to-be-changed weak-impression data), corresponding to the charge payment sign, of the degrading condition file 18. As illustratively shown in FIG. 16, if the charge payment sign is "1 ", 30 data are extracted, and if the charge payment sign is "0", 45 data are extracted.

Then, at step S23, the channel messages corresponding to the extracted data are deleted. Further, a reference is made to the degrading condition file 18 to extract the restricted number of times of reproduction and restricted number of times of copying corresponding to the charge payment sign and store the extracted restricted numbers in the exclusive message portion of the system exclusive event data of the MIDI data file (step S24), and thus a new MIDI data file is created at step S25. Because the delta times corresponding to the deleted channel messages are left undeleted, each of the delta times will be added to the delta time of the next channel message that follows the deleted channel message.

In an alternative, the new MIDI data file may be created by replacing the velocity values of the data, extracted at the predetermined ratio, with "0". Setting the velocity value "0" means deadening of tones.

In another alternative, the note number values of the data, extracted at the predetermined ratio, may be rewritten. For example, value "+1" or "−1" may be added to the note number values to create new note number values.

Further, predetermined weighting may be applied in multiplying the delta time and velocity. The product may be calculated using a mathematical expression "(delta time+ k)×(velocity+1)" where "k" and "1" are both predetermined constants, or "(delta time×a+k)×(velocity×b+1)" where "a", "b", "k" and "1" are predetermined constants.

Further, the data having small velocity values (weak-volume tones) may be deleted or changed, taking only the velocity into account. Similarly, the data having small delta time values (short duration tones) may be deleted or changed, taking only the delta time into account.

With such behavior of the server 10, the user of the user terminal 2 can acquire a MIDI data file having the same quality as the original MIDI data file as long as he or she has paid a high charge for the MIDI data file. If the user has paid a low charge, he or she can acquire a MIDI data file with a small degree of degradation. If the charge has not been paid at all, the user can only acquire a MIDI data file with an extremely great degree of degradation. Namely, the instant embodiment can provide differentiation in accordance with the charge payment so that user's willingness to pay the charge can be enhanced, which is advantageous to the data provider. The instant embodiment can also achieve an advantageous benefit of preventing copyright infringement.

② Behavior of the User Terminal:

The following paragraphs describe behavior of the user terminal, having received a MIDI data file, in transferring the received MIDI data file to another user terminal or reproducing the received MIDI data file.

Figure 7:
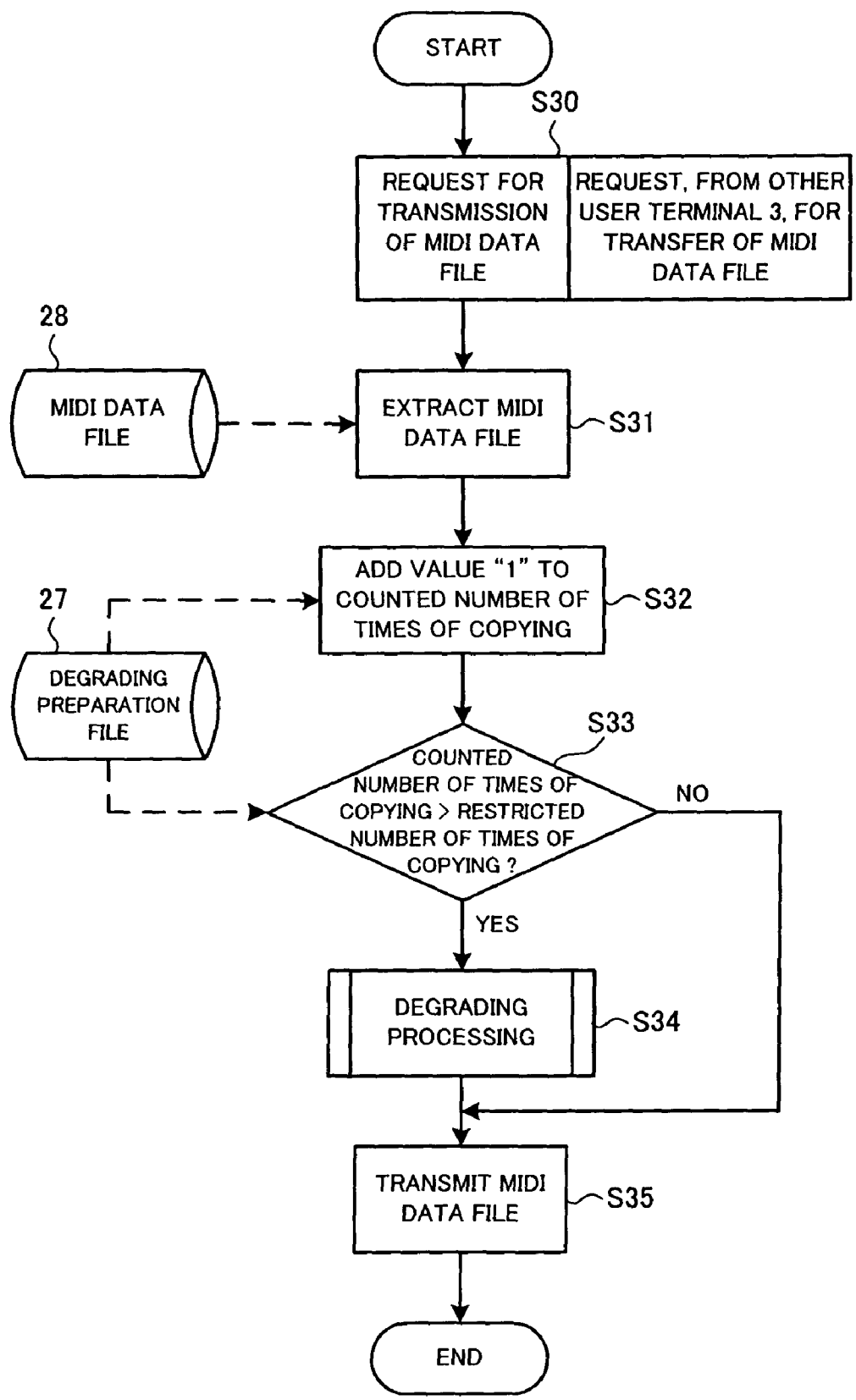
FIG. 7 is a flow chart explanatory of the degrading processing performed in the embodiment of FIG. 1.

(Process Performed by the User Terminal for Transferring MIDI Data File to other User Terminal):

Referring to FIG. 7, when predetermined operation has been performed by the user via the operation section 22 to request transmission of a predetermined MIDI data file via the short-range communication section 23, or when the user terminal 2 has received a request, from another user terminal 3, for transfer of a predetermined MIDI data file via the short-range communication section 23 (step S30), the control section 20 of the user terminal 2 extracts the MIDI data file in question from the storage section 28, at step S31. Then, value "1" is added to the counted number of times of copying corresponding to the file number which is included in the degrading preparation file of the storage section 27, and the added result is stored in the degrading preparation file as a new counted number of times of copying (step S32). Then, the control section 20 compares the new counted number of times of copying and the restricted number of times of copying stored in the exclusive message of the system exclusive event data of the MIDI data file, at step S33. If the new counted number of times of copying is greater than the restricted number of times of copying, the degrading processing is performed on the MIDI data file in accordance with the degrading processing program, to create a new MIDI data file (step S34). After that, the degraded new MIDI data file is transmitted to the user terminal 3 via the short-range communication section 23, at step S35.

If the counted number of times of copying is equal to or smaller than the restricted number of times of copying as determined at step S33, the degrading processing is not performed so that the MIDI data file is transmitted as it is (i.e., without data quality degradation) to the other user terminal (e.g., portable phone) 3) via the short-range communication section 23, at step S35.

Note that the degrading processing performed at step S34 is substantially the same as the one performed at step S12 and thus will not be described to avoid unnecessary duplication.

Depending on permissible number of times of copying that corresponding to the charge payment of the user terminal 2, the other user terminal 3 receives, from the user terminal 2, the MIDI data file having been degraded to a predetermined degree. For this reason, not only the user of the user terminal 2 but also the user of the user terminal 3 may have an enhanced willingness to pay the charge of the MIDI data file.

(Process Performed by the User Terminal for Reproducing MIDI Data File):

Referring to FIG. 8, when predetermined operation has been performed by the user, via the operation section 22, to request reproduction of a MIDI data file at step S50, the control section 20 of the user terminal 2 extracts the MIDI data file in question from the storage section 28, at step S51. Then, value "1" is added to the counted number of times of reproduction corresponding to the file number which is included in the degrading preparation file, and the added result is stored in the degrading preparation file as a new counted number of times of reproduction (step S52). Then, the control section 20 compares the new counted number of times of reproduction and the restricted number of times of reproduction stored in the exclusive message of the system exclusive event data of the MIDI data file, at step S53. If the new counted number of times of reproduction is greater than the restricted number of times of reproduction, the degrading processing is performed on the MIDI data file in accordance with the degrading processing program, to create a new MIDI data file (step S54). After that, the control section 20 extracts predetermined tone source data from the MIDI tone source file, stored in the storage section 29, in accordance with the MIDI file data having undergone the degrading processing, to create tone date (step S55). Then, the tone data are converted via the D/A converter section 24 into analog signals at step S56, so that the tone data are output via the sound output section 25 at step S57.

If the counted number of times of reproduction is equal to or smaller than the restricted number of times of reproduction as determined at step S53, predetermined tone source data are extracted from the MIDI tone source file, stored in the storage section 29, in accordance with the MIDI file data file without the degrading processing performed thereon, to create tone date (step S55). Then, the tone data are converted via the D/A converter section 24 into analog signals at step S56, so that the tone data are output via the sound output section 25 at step S57, similarly to the above-mentioned.

Note that the degrading processing performed at step S54 is substantially the same as the one performed at step S12 and thus will not be described to avoid unnecessary duplication.

With the arrangement that, when a MIDI data file is to be reproduced at the user terminal, the degrading processing is performed on the MIDI data file depending on the counted number of times of reproduction, the instant embodiment can enhance user's willingness to pay the charge, which can contribute to enhanced protection of the data provider and copyright.

If neither restricted number of times of reproduction nor restricted number of times of copying is set, or if the restricted number of times of reproduction and the restricted number of times of copying are each set to "0", even when a MIDI data file is reproduced or copied only one time, the degrading processing can be performed on the MIDI data file, which will be more effective. In this case, when the MIDI data file is to be transmitted from the user terminal 3 to still another user terminal, a further degrading processing is performed on the MIDI data file at the user terminal, so that the further degraded MIDI data file can be transmitted to the other user terminal. Thus, as the number of times the MIDI data file is copied to other user terminals increases, the data will be degraded more and more.

If the counted number of times of reproduction and counted number of times of copying of each MIDI data file are stored in the exclusive message of the system exclusive event data in the MIDI data file, they can be treated as ones that do not depend on the user terminal, which can thereby set even stronger limits to reproduction and copying.

Alternatively, information indicative of the restricted number of times of reproduction and the restricted number of times of copying may be transmitted from the server 10 to the user terminal 2 along with a MIDI data file, instead of being stored in the exclusive message of the system exclusive event data in the MIDI data file. In this case, the user terminal 2 may store the information of the restricted numbers in a predetermined storage section, and the degrading processing program may be built, with reference to the stored information, to perform the degrading processing.

(3) Modification:

① First Modification:

For each of reproduction and copying, there may be set a plurality of restricted numbers of times in a stepwise manner, so that the degree of degradation increases as the counted number of times of reproduction or copying increases.

As an example, a secondary restricted number of times of copying, such as one equaling "restricted number of times of copying+5", greater than the above-mentioned numbers may be set in addition to the above-mentioned numbers. In this case, as illustrated in FIG. 18, the degrading processing is not performed when "0≦counted number of times of copying≦restricted number of times of copying"; namely, the number of weak-impression data to be extracted (to-be-changed weak-impression data) is set to zero. When "restricted number of times of copying≦counted number of times of copying≦secondary restricted number of times of copying (restricted number of times of copying+5)", the number of weak-impression data to be extracted is set to "30" in the degrading processing. When "secondary restricted number of times of copying (restricted number of times of copying+5)<counted number of times of copying", the number of weak-impression data to be extracted is set to "45" in the degrading processing. Namely, different degrees of degradation, i.e. numbers of weak-impression data to be extracted, are stored in the storage section in association with the restricted number of times of copying and secondary restricted number of times of copying, so that a specific number of weak-impression data to be extracted is determined with reference to the information stored in the storage section in accordance with the counted number of times of copying, restricted number of times of copying and secondary restricted number of times of copying for a MIDI data file that should be subjected to the degrading processing.

Similar modification applies to the number of times of reproduction. For example, a secondary restricted number of times of reproduction, such as one equaling "restricted number of times of reproduction+25", may be set. In this case, as illustrated in FIG. 18, the degrading processing is not performed when "0≦counted number of times of reproduction≦restricted number of times of reproduction"; namely, the number of weak-impression data to be extracted (to-be-changed weak-impression data) is set to zero. When "restricted number of times of reproduction<counted number of times of reproduction≦secondary restricted number of times of reproduction (restricted number of times of reproduction+25)", the number of weak-impression data to be extracted is set to "30" in the degrading processing. When "secondary restricted number of times of reproduction (restricted number of times of reproduction+25)<counted number of times of reproduction", the number of weak-impression data to be extracted is set to "45" in the degrading processing. Namely, different degrees of degradation, i.e. numbers of weak-impression data to be extracted, are stored in the storage section in association with the restricted number of times of reproduction and secondary restricted number of times of reproduction, so that a specific number of weak-impression data to be extracted is determined in accordance with the counted number of times of reproduction, restricted number of times of reproduction and secondary restricted number of times of reproduction for a MIDI data file that should be subjected to the degrading processing, similarly to the number of times of copying set forth above.

The above-described arrangement allows the degree of degradation to progressively become greater in accordance with the counted number of times of copying or reproduction, and thereby can maintain superiority of the original MIDI data file.

Note that the secondary restricted number of times of copying and the secondary restricted number of times of reproduction may be set for each predetermined restricted number of times of copying and each predetermined restricted number of times of reproduction. Alternatively, only one secondary restricted number of times of copying and only one secondary restricted number of times of reproduction may be set. In another alternative, the number of times of copying and the number of times of reproduction may each be classified into three or more stages so that a further restricted number of times can be set for each of the stages.

② Second Modification:

The following paragraphs describe a modification where, when the degrading processing has been performed on a MIDI data file, information about a history of data degradation or change is stored in the exclusive message of the system exclusive event data in the MIDI data file. At that time, a degradation cancellation sign is also stored; in an initial state, the degradation cancellation sign is set to value "0" indicative of a non-canceled degradation state.

As set forth above, the server 10 receives, form the user terminal 2, a request for transmission of a MIDI data file and the control section 11 performs the degrading processing on the requested MIDI data file in accordance with the charge payment sign and on the basis of the degrading processing program. Upon completion of the degrading processing, the control section 11 stores information indicative of degrading changes made to the MIDI data file in the exclusive message of the system exclusive event data in the MIDI data file.

After that, if the server 10 has decided on canceling the degradation of the MIDI data file due to the fact that the user of the terminal 2 has satisfied a predetermined condition, for example, by paying an additional charge, the server 10 transmits, to the user terminal 2 via the Internet NET, the degradation cancellation sign "1" (indicative of cancelled degradation) and file number of the MIDI data file. The control section 20 of the user terminal 2 extracts the MIDI data file of the file number, and performs a process for restoring the original MIDI data file before the degrading changes with reference to the information about the history of the degrading changes stored in the exclusive message of the system exclusive event data in the MIDI data file.

The user terminal 2 may include a degrading change history file (not shown), in which there may be stored, along with the file number, the history information of the degrading changes made to the MIDI data file. Each time the degrading processing is performed on a MIDI data file at the user terminal 2, degrading changes made to the MIDI data file are stored in the degrading change history file, and the control section 20 of the user terminal 2 may restore the original MIDI data file before the degrading changes, by referring to the degrading changes of the degrading change history file in accordance with a predetermined condition.

Further, different degradation cancellation signs may be provided in a stepwise manner so that different levels of data restoration can be employed in a stepwise manner, such as a level where the degraded MIDI data file is restored exactly to the original MIDI data file with no degrading change made thereto at all and a level where the degraded MIDI data file is restored to a state where the data file was subjected to the degrading processing a predetermined number of times before.

Further, the server 10 may include a degrading change history file (not shown), in which there may be stored, along with the user ID and file number, information about a history of degrading changes made to the MIDI data file each time the degrading processing is performed.

Figure 9:
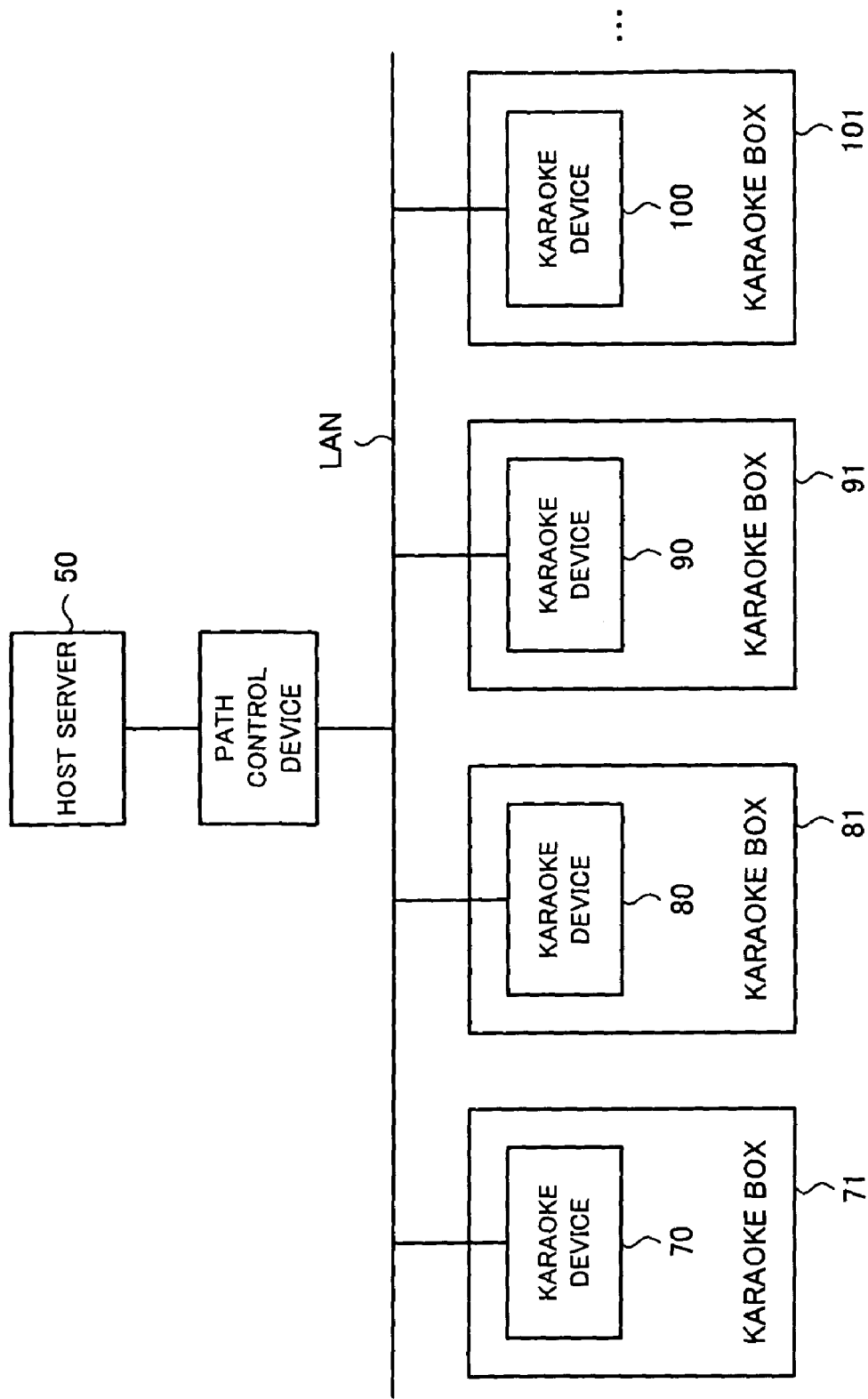
FIG. 9 is a block diagram showing a general setup of a system in accordance with a second embodiment of the present invention.

2. Second Embodiment (1) Setup:

① General Setup:

Now, a description will be given about a second embodiment of the present invention. FIG. 9 is a block diagram showing a system in accordance with a second embodiment of the present invention. In the figure, reference numeral 50 represents a host server, which is connected to a LAN (Local Area Network) via a communication path control device and data bus. Reference numerals 70, 80, 90, 100, . . . represent user terminals in the form of karaoke devices. The user terminals (karaoke devices) 70, 80, 90, 100, . . . each include an operation section, such as a keyboard panel, having push buttons and switches.

In the instant embodiment, when a MIDI data file is to be transmitted from the host server 50, via the LAN, to any one of the user terminals 70, 80, 90, 100, degrading processing is performed on the MIDI data file in accordance with a status of payment of a charge for use of the file at a karaoke box 71, 81, 91, 101, . . . . If a high charge has been paid by the user for use of the file at the karaoke box, no degrading processing is carried out, but if a low charge has been paid, degrading processing of low degree is carried out. Further, if the necessary charge has not been paid at all, degrading processing of high degree is carried out.

Figure 10:
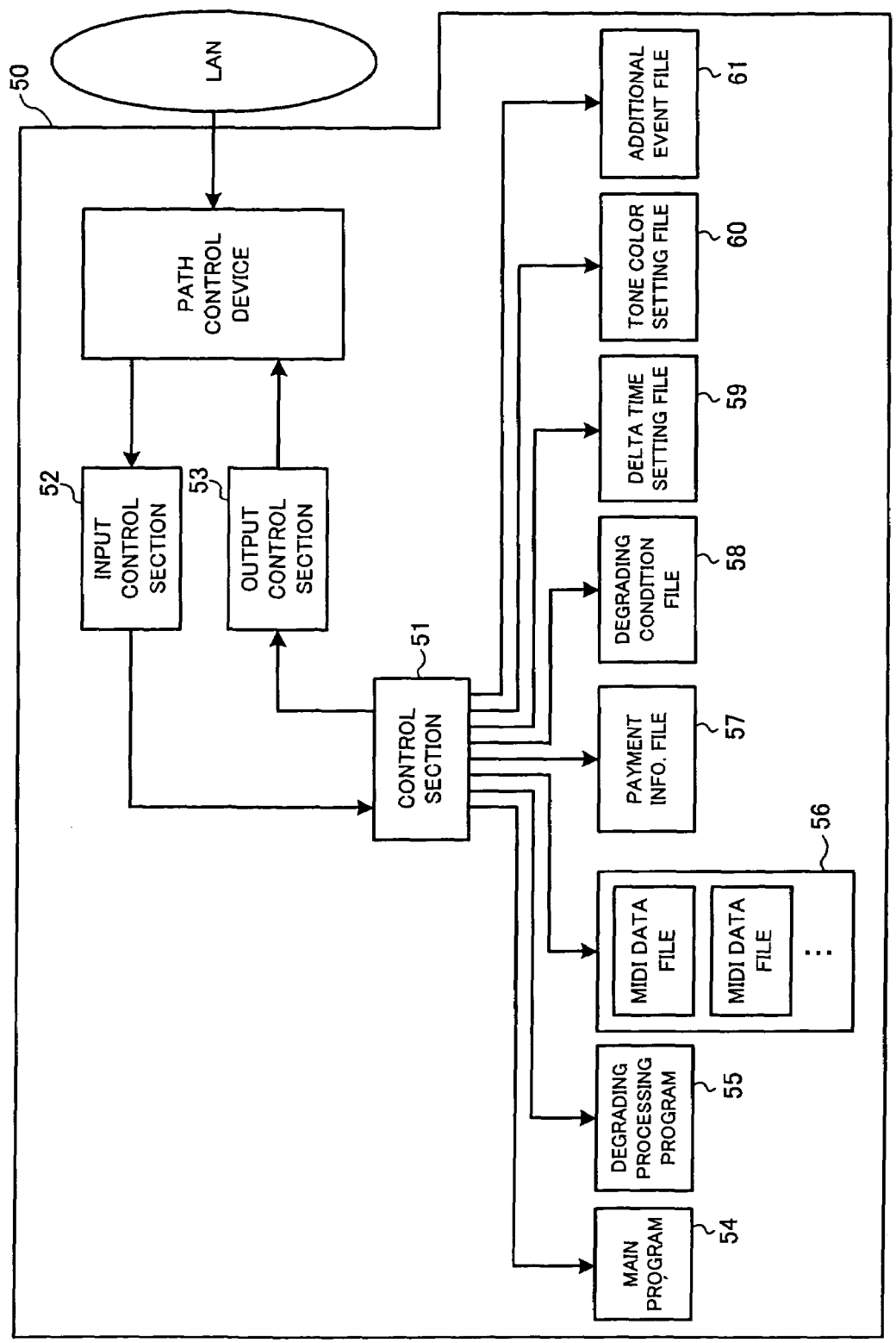
FIG. 10 is a block diagram showing an example specific structure of a host server in the second embodiment of FIG. 9.

② Structure of the Host Server:

Specific structure of the host server 50 is described below. FIG. 10 is a block diagram showing an example specific structure of the host server 50. In the figure, reference numeral 51 represents a control section comprising, for example, a CPU, which controls various components of the host server 50, transmits various data, performs various arithmetic operations and temporarily stores various data in memory. Reference numeral 52 represents an input control section, which controls data received from any one of the user terminals connected to the server 50 via the LAN. Reference numeral 53 represents an output control section, which controls data to be output to any one of the user terminals connected to the server 50 via the LAN. Reference numerals 54–61 represent storage sections, in which files to be described below are stored.

In the storage section 54, there is prestored a main program for use in the control section 51. The main program includes a program for displaying a predetermined screen on a display section of any of the user terminals, program for transmitting a predetermined MIDI data file to any of the user terminals, etc.

In the storage section 55, there is prestored a degrading program for use in the control section 51. The degrading program is intended to intentionally degrade the data quality of a predetermined MIDI data file.

In the storage section 56, there are prestored MIDI data files, each of which includes performance data, file number data identifying the MIDI data file, etc.

In the storage section 57, there is stored a charge payment information file that is created to store payment information of each individual user terminal. Charge payment signs are stored in the storage section 57 along with user IDs. The charge payment signs each represent a payment level corresponding to an amount paid by a user. In the instant embodiment, charge payment sign "2l" is stored if a high charge has been paid, charge payment sign "1" is stored if a low charge has been paid, and charge payment sign "0" is stored if the charge has not been paid at all.

In the storage section 58, there is stored a degrading condition file. The degrading condition file stores information on degrading conditions preset in correspondence with the charge payment signs. The degrading conditions are conditions for performing the degrading processing to intentionally degrade the quality of an original MIDI data file. FIG. 19 illustrates degrading conditions to be included in a degrading condition file; as shown, the degrading conditions comprise condition of the charge payment signs, and conditions of a ratio of data to be quantized and a ratio of data to be changed in tone color as data indicative of a degree of degradation.

The degree of degradation indicates a degree of the degrading processing.

The degrading processing includes a process for deleting weak-impression data as set forth above in relation to the first embodiment, a process for quantizing note-on data in a MIDI data file, and a process for changing a tone color setting of program change data in a MIDI data file. Therefore, the degree of degradation indicates a ratio of data to be quantized and a ratio of data to be changed in tone color in the degrading processing.

In the instant embodiment, if a high charge has been paid, the degree of degradation is set to "0", and value "0" is stored as the number of weak-impression data to be deleted, ratio of data to be quantized and ratio of data to be changed in tone color. If a low charge has been paid, then a relatively small value is stored as the number of weak-impression data to be deleted, ratio of data to be quantized and ratio of data to be changed in tone color. If the charge has not been paid at all, then a relatively great value is stored as the number of weak-impression data to be deleted, ratio of data to be quantized and ratio of data to be changed in tone color.

In the storage section 59, there is prestored a delta time setting file, which is used in the degrading process of MIDI data files. FIG. 20 shows an example of preset reference delta time values, corresponding to various notes, used in the instant embodiment. However, these preset reference delta time values may differ depending on the time unit information in the header block, presence of tuplet (group of notes), etc., and thus the preset reference delta time values are shown just for illustrative purposes.

In the storage section 60, there is stored in a tone color setting file, which is used in the degrading processing of MIDI data files. In the tone color setting file, program numbers to be used for MIDI event data in MIDI data files are stored in groups classified according to the tone colors, and each of the program numbers is stored in combination or association with another program number of the same group as the program number in question.

In the instant embodiment, as illustratively shown in FIG. 21, there is provided a group of five different program numbers (e.g., program Nos. 11, 12, 13, 14 and 15) for a trumpet tone color, and each of the program numbers for the trumpet tone color is stored in association with another program number of the same trumpet tone color group as the program number in question; that is, different trumpet tone colors are set for each one of the program numbers belonging to the same trumpet tone color group. Similar settings are made for each of the other tone colors, such as piano and violin tone colors.

In the storage section 61, there is stored an additional event file, which is used in the degrading processing of MIDI data files. Examples of event data of the additional event file include note-on data, program change data, etc.

Figure 11:
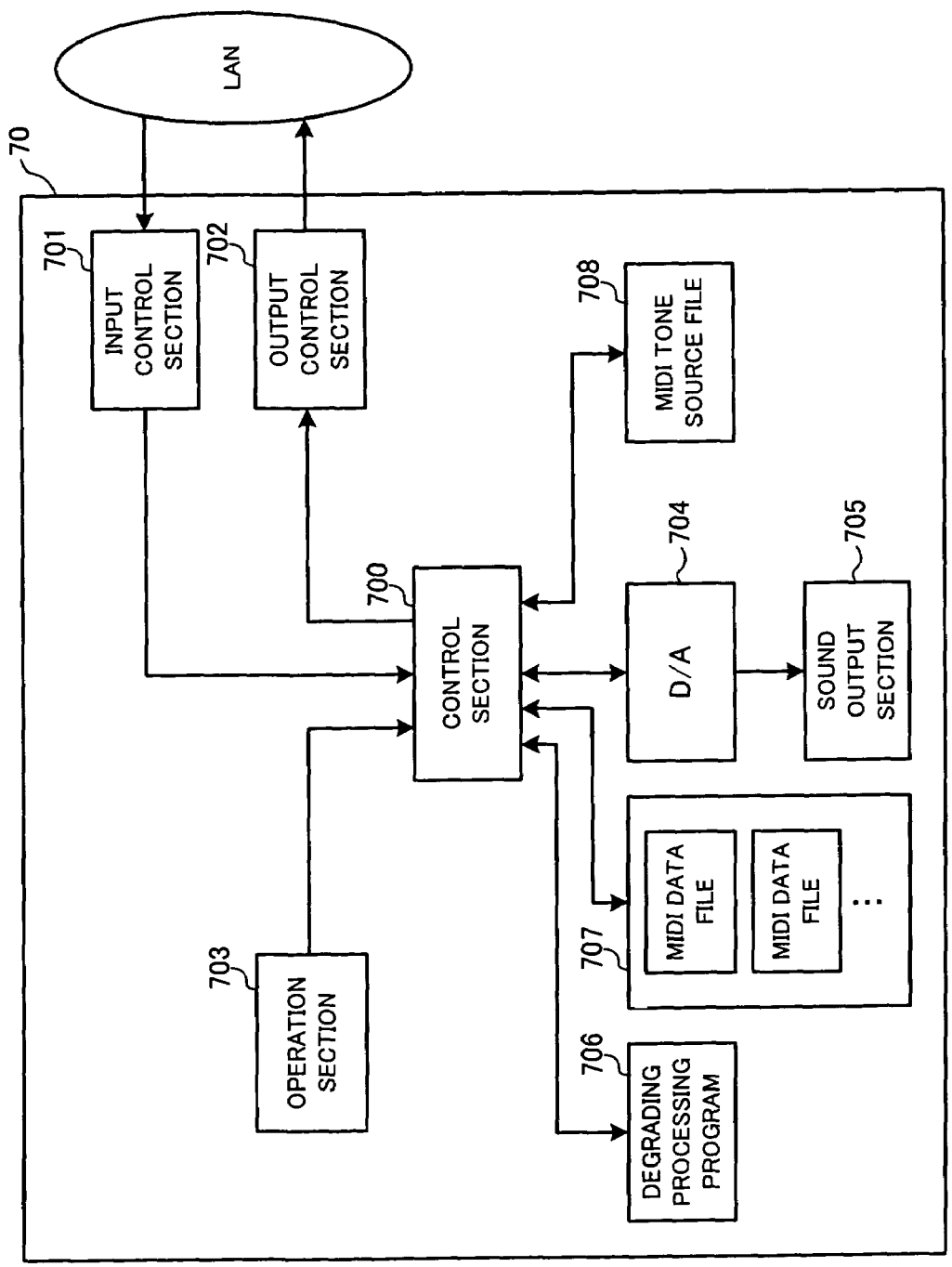
FIG. 11 is a block diagram showing an internal structure of a karaoke device as a user terminal in the embodiment of FIG. 9.

③ Structure of the User Terminal:

Internal structure of the user terminal 70 is described with reference to FIG. 11. Let it be assumed that the user terminals 70, 80, 90, 100, . . . are all constructed in a similar manner. Only elements pertinent to the essential features of the instant embodiment are described. In the figure, reference numeral 700 represents a control section comprising, for example, a CPU, which controls various components of the user terminal, transmits various data, performs various arithmetic operations and temporarily stores various data in memory. Reference numeral 701 represents an input control section, which controls data received from the host server 50 via the LAN. Reference numeral 702 represents an output control section, which controls data to be output to the server 50 connected with the user terminal via the LAN. 703 represents an operation section, such as a keyboard panel, having push buttons and switches. Reference numeral 704 represents a D/A converter section for converting each digital tone data, generated in accordance with a MIDI data file, into analog representation. 705 represents a sound output section for outputting the tone data having been subjected to the D/A conversion. Further, reference numerals 706–708 represent storage sections, in which files to be described below are stored.

In the storage section 706, there is prestored a degrading program for use in the control section 700. The degrading program is intended to intentionally degrade the data quality of a predetermined MIDI data file.

In the storage section 707, there are prestored MIDI data files, each of which includes performance data, file number data identifying the MIDI data file, etc.

Further, in the storage section 708, there is stored a MIDI tone source file, which includes tone source data of tones corresponding to scale notes, i.e. note numbers, and tone colors, i.e. program numbers, described in a MIDI data file.

Note that the MIDI tone source may be any of various tone sources, such as the PCM, FM and physical model tone sources.

(2) Behavior:

The following paragraphs describe behavior of the second embodiment.

① Behavior of the Host Server:

The following paragraphs describe behavior of the host server 50, to which the user terminal 70 is connected for communication. Once the user terminal 70 is connected to the host server 50, the control section 51 detects the connection via the input control section 52, and controls the connected user terminal 70 in accordance with the main program.

Then, when the user terminal 70 has made a request for transmission of a predetermined MIDI data file, the control section 51 refers to the charge payment sign included in the charge payment information file of the storage section 57 in accordance with the user ID of the user terminal 70. If the charge payment sign is "2", the requested MIDI data file is transmitted as it is (without data quality degradation) to the user terminal 70 via the output control section 53 in accordance with the main program. If the charge payment sign is "0" or "1", the degrading processing is performed on the MIDI data file in accordance with the degrading processing program and on the basis of the information included in the degrading condition file stored in the storage section 58, and thus a new MIDI data file is created. Then, the control section 51 transmits the MIDI data file, newly created through the degrading processing, to the user terminal 70 via the output control section 53 in accordance with the main program.

In turn, the control section 700 of the user terminal 70 stores the MIDI data file, received from the server, in its storage section 707. Then, the control section 700 extracts predetermined tone source data from the MIDI tone source file of the storage section 508 in accordance with the MIDI data file, to thereby generate tone data. Each of the tone data is output via the sound output section 705 after being converted via the D/A converter section 704 into an analog signal.

Note that the user terminal 70 may include an image output section (not shown) so that predetermined images can be visually output via the image output section as the tone data are audibly output via the sound output section 705.

Further, similarly to the user terminal 2 in the above-described first embodiment, the user terminal 70 may be constructed to appropriately vary the degree of degradation in accordance with a restricted number of times of reproduction or copying so as to perform the degrading processing with the appropriately varied degree of degradation. Also, the user terminal 70 may include degrading change history information so that an original MIDI data file before the degrading processing can be restored with reference to the degrading change history information and in accordance with predetermined conditions.

(MIDI Data Degrading Processing)

Here, a detailed description is given about the degrading processing performed by the control section 51 of the host server 50 for intentionally degrading a MIDI data file in accordance with the degrading processing program.

In the degrading processing of the instant embodiment, there may be performed just one of, or a combination of two or more, of the process for quantizing note data, process for changing a tone color setting, process for adding event data, and process for deleting or changing weak-impression note data as set forth above in relation to the first embodiment.

(i) Quantizing Process:

This process is intended to quantize, or apply quantization to, a MIDI data file by replacing delta times of MIDI event data.

Figure 12:
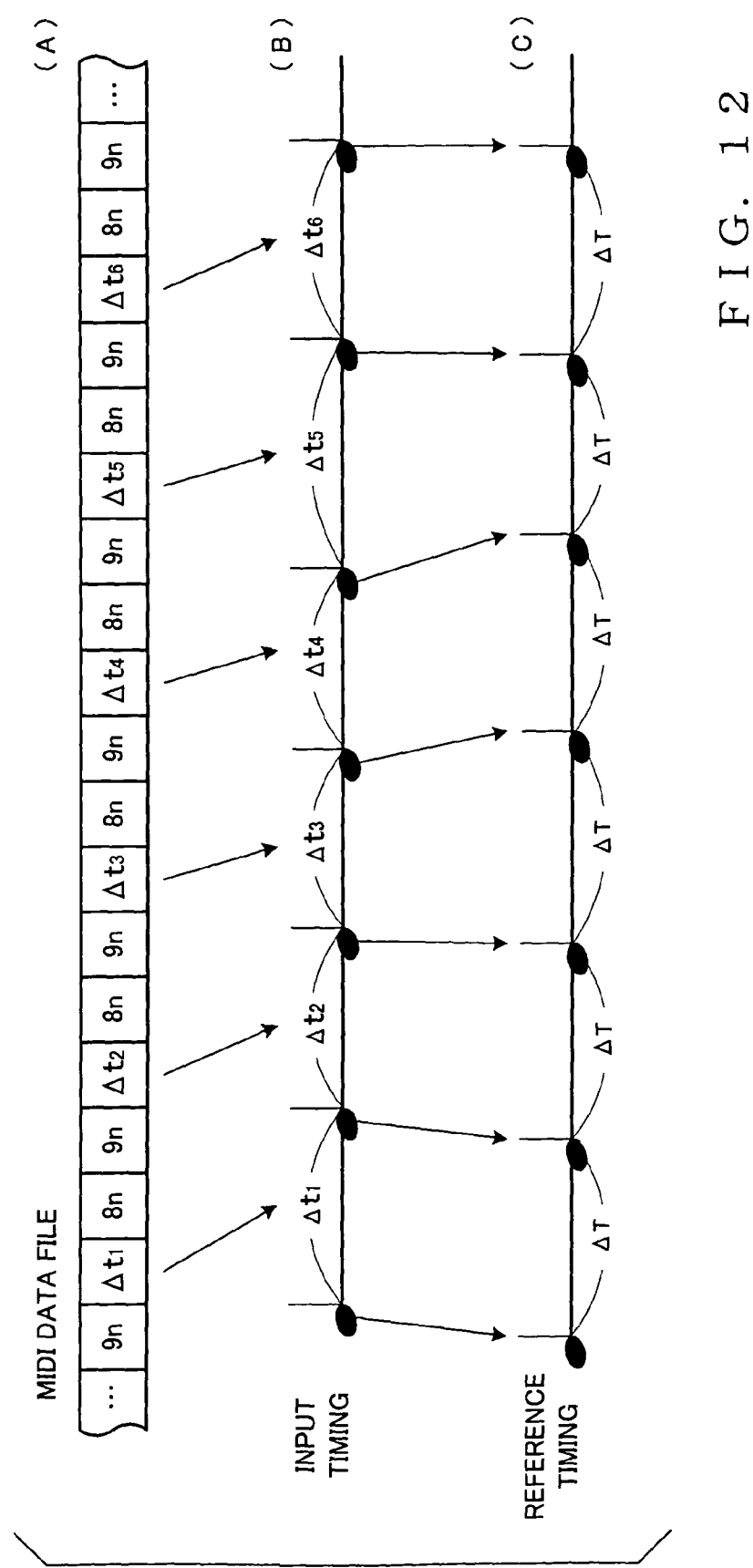
FIG. 12 is a diagram explanatory of a quantization process carried out in degrading processing in the embodiment of FIG. 9.

First, the basic concept of "quantization" is explained briefly with reference to FIG. 12.

Section (A) of FIG. 12 schematically shows a MIDI data file with note numbers etc. omitted for clarity. Delta times $\Delta t_2$, $\Delta t_3$, $\Delta t_4$, $\Delta t_5$, $\Delta t_6$, . . . indicated between note-on data (data of status "9n") and note-off data (data of status "8n") each represent a tone generating time (duration) of a tone of the corresponding note number. Assuming that the length of a quarter note is a reference length, any delta time $\Delta t$ that differs from a reference tone generating time (duration) of the quarter note converted in accordance with the time unit information would result in deviation in timing from the reference quarter note, as illustratively shown in section (B) of FIG. 12. Ordinarily, high-quality MIDI data files based on actual performances have data more or less deviating from the reference note timing. Therefore, the instant embodiment performs the process for quantizing note data to replace the delta times $\Delta t$ with times $\Delta T$ so that every delta time becomes the reference tone generating time (duration) $\Delta T$ of a quarter note. In the instant embodiment, such a quantizing process is carried out randomly regardless of user's intention. Thus, tones generated on the basis of the quantized MIDI data file would assume a mechanical tune quantized from an original natural tune, which would thus make the user to feel as if reproducibility of the original music piece were degraded considerably.

Figure 13:
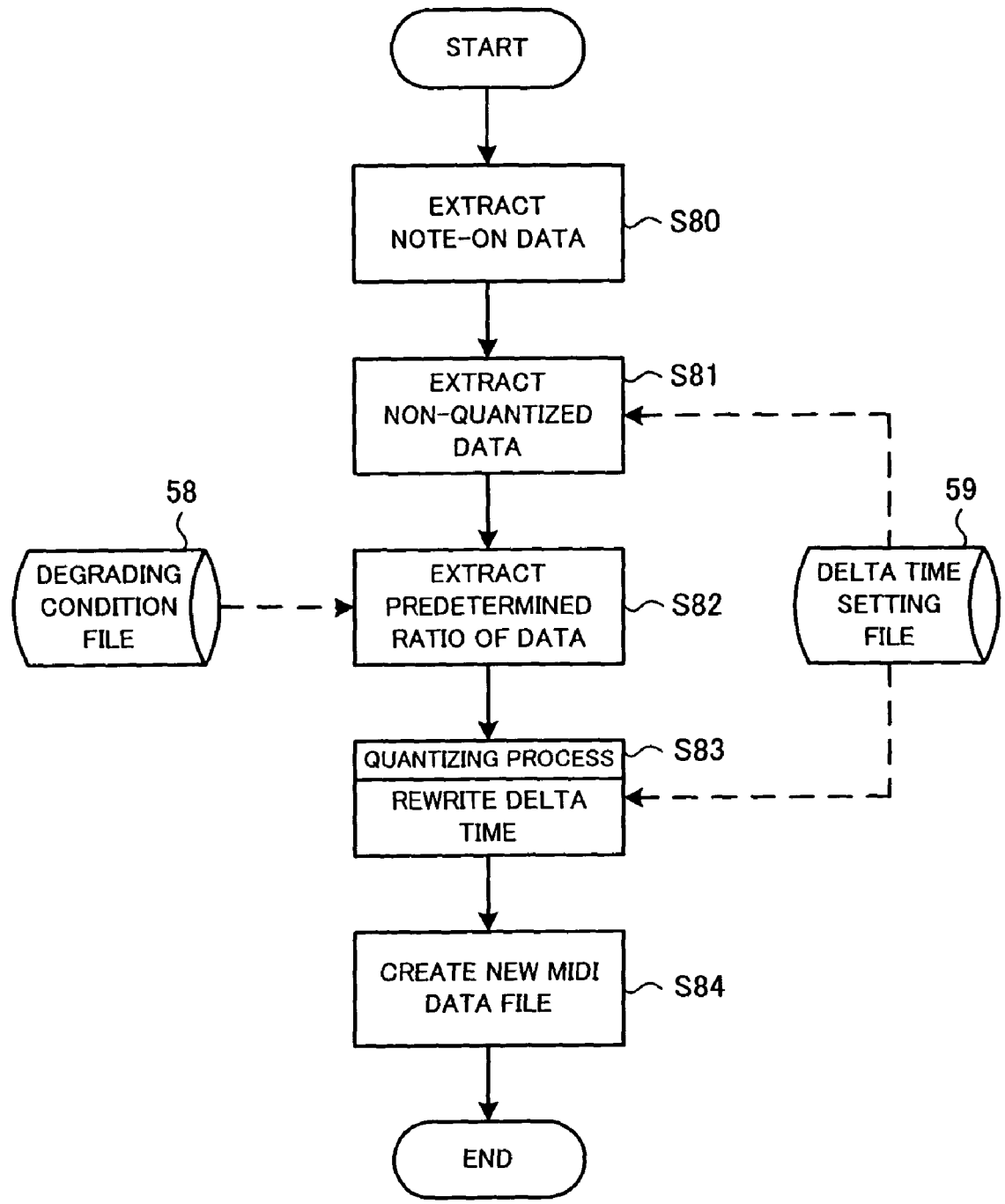
FIG. 13 is a flow chart explanatory of the degrading processing performed in the embodiment of FIG. 9.

FIG. 13 is a flow chart showing an exemplary step sequence of the degrading processing performed in the instant embodiment. MIDI data file to be subjected to the degrading processing is temporarily read out to the control section 51 of the host server, from which all note-on data, i.e. data having the status of "9n ", are extracted (step S80). Then, of the extracted note-on data, non-quantized data, i.e. data having delta times different from the predetermined reference values, are extracted, at step S81. Then, a predetermined ratio (which may be a predetermined number) of the non-quantized data are extracted arbitrarily, at step S82. At this time, a reference is made to the degrading condition file stored in the storage section 58 so that the predetermined ratio of the non-quantized data are extracted in accordance with the degree of degradation, i.e. ratio of data to be extracted, corresponding to the charge payment sign. For example, 10% of the non-quantized data are extracted if the charge payment sign is "1", or 20% of the non-quantized data are extracted if the charge payment sign is "0", as illustratively shown in FIG. 19. After that, the thus-extracted data are quantized, i.e. the delta times are replaced with the corresponding predetermined reference values, at step S83. New MIDI data file is created, at step S84, by thus replacing the delta times of all of the data extracted in accordance with the predetermined ratio.

For example, if the delta time of data is "470", the value "470" is subtracted from all the reference values as shown in FIG. 20, and one of the reference values, which presents the smallest difference, is set as the reference value corresponding to the given data. In the illustrated example, "480" is set as the corresponding reference value, and thus the quantizing process is executed on the basis of a quarter note with the delta time replaced with "480".

The quantization may be applied on a measure-by-measure basis. For example, a predetermined number of measures are extracted, and the quantizing process is performed on note-on data, included in the extracted measures, on the measure-by-measure basis.

(ii) Process for Changing Tone Color Setting:

This tone-color-setting changing process is intended to replace tone colors, set in a MIDI data file, with other tone colors of same types as the set tone colors.

Figure 14:
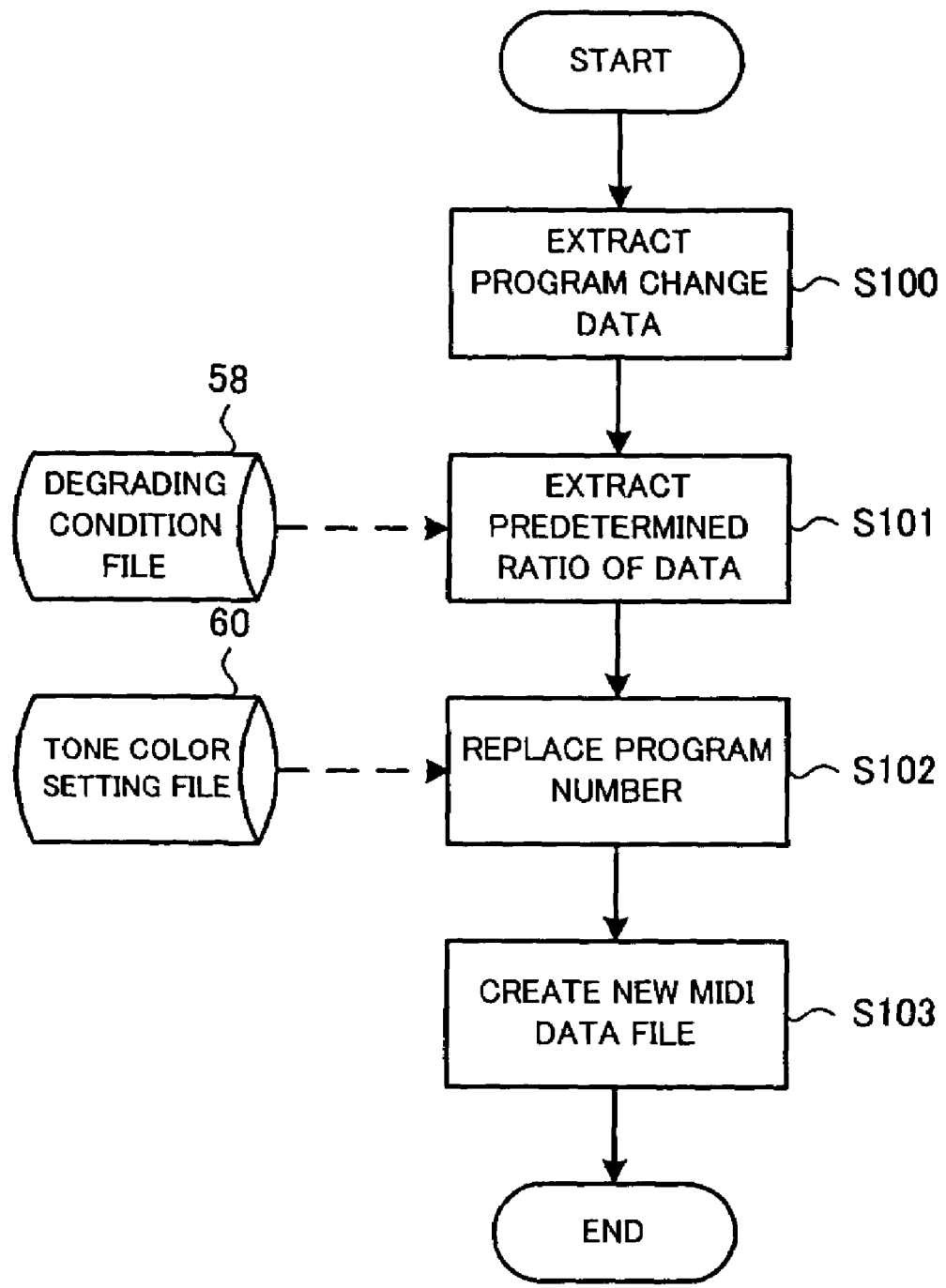
FIG. 14 is a flow chart explanatory of the degrading processing performed in the embodiment of FIG. 9.

As illustrated in FIG. 14, a MIDI data file to be subjected to the degrading processing is temporarily read out to the control section 51 of the host server, from which all program change data, i.e. data having the status of "Cn", of MIDI event data are extracted (step S100). Then, a predetermined ratio (which may be a predetermined number) of the program change data are extracted arbitrarily, at step S101. At this time, a reference is made to the degrading condition file stored in the storage section 58 so that the predetermined ratio of the program change data are extracted in accordance with the degree of degradation, i.e. ratio of data to be extracted, corresponding to the charge payment sign. For example, 10% of the program change data are extracted if the charge payment sign is "1", or 20% of the program change data are extracted if the charge payment sign is "0", as illustratively shown in FIG. 19. After that, the program numbers of the thus-extracted data are each replaced with a predetermined replacing program number that is stored in the tone color setting file of the storage section 60 and corresponds to the program number, at step S102. New MIDI data file is created, at next step S103, by thus replacing the program numbers of all of the data extracted in accordance with the predetermined ratio.

For example, if the program number is "14", it is replaced with program number "15" because the replacing program number associated with the program number "14" is "15" as illustrated in FIG. 21.

Note that the extracted data themselves may be deleted instead of their program numbers being replaced in the above-mentioned manner.

(iii) Process for Adding New Event Data:

This new-event-data adding process is intended to add appropriate event data to a MIDI data file. The MIDI data file to be subjected to the degrading processing is temporarily read out to the control section 51 of the host server. Then, arbitrary event data stored in the additional event file of the storage section 61 are added to the MIDI data file in correspondence with arbitrary delta times, to thereby create a new MIDI data file. It is desirable that the additional event data be such data as to degrade the quality of the MIDI data by being added to the MIDI data; for example, the additional event data may be data of noise-like events.

According to the above-described degrading processing, a MIDI data file is temporarily read out to the control section 51, in response to a transmission request, reproduction request, copying request or the like, on condition that predetermined conditions are met, although no specific change has been instructed at the user terminal. The thus read-out MIDI data file is subjected to the changing or degrading processing in accordance with predetermined conditions.

The degrading processing can degrade the MIDI data file only to the extent giving an impression that the data file has been lowered in quality, without greatly impairing the general image of the original data.

3. Modification:

It should be appreciated that the present invention is not limited to the above-described embodiments and various modifications of the invention are also possible as set forth below.

(1) Whereas the server 10 and user terminal 2 are interconnected via the Internet NET in the first embodiment, the server 10 and user terminal 2 may be interconnected in any other suitable manner. Further, needless to say, a plurality of other user terminals than the user terminal 2 may be connected to the server 10. Furthermore, the user terminals connected to the server 2 may be any other devices with a built-in computer than personal computers and portable phones, such as karaoke devices, PDAs and PHSs.

Furthermore, the degrading processing performed in the first embodiment may include one or more of the quantizing process, tone-color-setting process and event-data addition process described in relation to the second embodiment.

Furthermore, the restricted number of times of reproduction, restricted number of times of copying and other information may be stored in any other suitable portion of a MIDI data file than the system exclusive portion, as long as the other portion is one that does not directly affect tones to be generated.

(2) In the above-described first and second embodiments, the degrading processing program may be installed in any of various information processing devices, such as a personal computer, PDA and PHS, rather than in any of the server, portable phone and karaoke device. Conversely, the information processing device may not itself contain the degrading processing program, in which case the information processing device may perform the degrading processing on a MIDI data file by reading out the degrading processing program stored in a storage medium.

In the case where the degrading processing program is installed in a personal computer or the like, the degrading processing may be performed on a MIDI data file when the file is to be copied from the personal computer to a storage medium, such as a floppy disk or compact disk. Conversely, the degrading processing may be performed on a MIDI data file when the file is to be copied from a storage medium, such as a floppy disk or compact disk, to a storage section of the personal computer. Further, the degrading processing may be performed on a MIDI data file when the file is to be transmitted from the personal computer to another personal computer.

(3) Further, when a MIDI data file is to be transmitted from the server to the user terminal, the server may encrypt the MIDI data file to output the encrypted MIDI data file to the user terminal. In this case, the user terminal may contain a decrypting program to decrypt the encrypted MIDI data file, to thereby obtain a reproducible MIDI data file. In this case, the encrypted MIDI data file also includes charge payment information, and the decrypting program includes a deteriorating processing function. When decrypting the MIDI data file, the decrypting program reads out the payment information so that, if the charge has been paid, only the decrypting process is performed on the data but, if the charge has not been paid at all, not only the decrypting process but also the degrading processing is performed on the data.

In summary, the present invention can maintain the predominance of original data by degrading tone reproducing digital data.

What is claimed is:

1. An information processing apparatus comprising:
a storage section storing tone reproducing digital data including information indicative of notes to be sounded and tone generating time lengths of the notes;
a readout section that, in response to a readout instruction, reads out the tone reproducing digital data from said storage section;
a note extraction section that extracts, from among the tone reproducing digital data read out by said readout section, notes meeting a predetermined condition;
a data change section that changes the information indicative of the tone generating time lengths of the notes extracted by said note extraction section, to thereby perform a quantizing process on the notes; and
an output section that reproduces or outputs, to external equipment, the tone reproducing digital data having been changed by said data change section.

2. An information processing apparatus comprising:
a storage section storing tone reproducing digital data including information indicative of notes to be sounded and a tone color of the notes;
a readout section that, in response to a readout instruction, reads out the tone reproducing digital data from said storage section;
a note extraction section that extracts, from among the tone reproducing digital data read out by said readout section, notes meeting a predetermined condition;
a data change section that changes the information indicative of the tone color of the notes extracted by said note extraction section; and
an output section that reproduces or outputs, to external equipment, the tone reproducing digital data having been changed by said data change section.

3. An information processing apparatus comprising:
a storage section storing tone reproducing digital data including information indicative of tone generating intensity levels and tone generating time lengths of notes to be sounded;
a readout section that, in response to a readout instruction, reads out the tone reproducing digital data from said storage section;
a note extraction section that extracts, from among the tone reproducing digital data read out by said readout section, notes meeting a predetermined condition regarding either or both of the tone generating intensity level and tone generating time length;
a data change section that deletes the notes extracted by said note extraction section; and
an output section that reproduces or outputs, to external equipment, the tone reproducing digital data having the extracted notes deleted therefrom by said data change section.

4. An information processing apparatus comprising:
a storage section storing tone reproducing digital data including information indicative of tone generating intensity levels and tone generating time lengths of notes to be sounded;
a readout section that, in response to a readout instruction, reads out the tone reproducing digital data from said storage section;
a data change section that changes the tone reproducing digital data read out from said storage section, by adding new tone generating events to the digital data on the basis of a predetermined algorithm; and an output section that reproduces or outputs, to external equipment, the tone reproducing digital data having the new tone generating events added thereto by said data change section.

5. An information processing apparatus as claimed in claim 1 which further comprises:
   a counter section that counts a number of times the tone generating digital data are read out from said storage section, and
   a determination section that, on the basis of the number of times counted by said counter section, determines whether or not a change process should be performed on the read-out tone reproducing digital data.

6. An information processing apparatus as claimed in claim 1 which further comprises:
   a payment information storage section that stores payment information indicative of payment made by a user for a necessary charge; and
   a determination section that, on the basis of the payment information stored in said payment information storage section, determines degree of a change to be made by said data change section to the tone reproducing digital data.

7. An information processing apparatus as claimed in claim 1 which further comprises:
   a history information storage section that stores change history information including information indicative of contents of a change made by said data change section to the tone reproducing digital data; and
   a restoration section that, on the basis of the change history information stored in said history information storage section, restores the tone reproducing digital data, changed by said data change section, to original tone reproducing digital data.

8. An information processing apparatus as claimed in claim 1 which further comprises:
   a history addition section that adds, to the tone reproducing digital data, change history information including information indicative of contents of a change made by said data change section to the tone reproducing digital data; and
   a restoration section that, on the basis of the change history information included in the tone reproducing digital data, restores the tone reproducing digital data, changed by said data change section, to original tone reproducing digital data.

9. An information processing method comprising:
   a storage step of storing tone reproducing digital data including information indicative of notes to be sounded and tone generating time lengths of the notes;
   a readout step of, in response to a readout instruction, reading out the tone reproducing digital data stored by said storage step;
   a note extraction step of extracting, from among the tone reproducing digital data read out by said readout step, notes meeting a predetermined condition;
   a data change step of changing the information indicative of the tone generating time lengths of the notes extracted by said note extraction step, to thereby perform a quantizing process on the notes; and
   an output step of reproducing or outputting, to external equipment, the tone reproducing digital data having been changed by said data change step.

10. An information processing method comprising:
    a storage step of storing tone reproducing digital data including information indicative of notes to be sounded and a tone color of the notes;
    a readout step of, in response to a readout instruction, reading out the tone reproducing digital data stored by said storage step;
    a note extraction step of extracting, from among the tone reproducing digital data read out by said readout step, notes meeting a predetermined condition;
    a data change step of changing the information indicative of the tone color of the notes extracted by said note extraction step; and
    an output step of reproducing or outputting, to external equipment, the tone reproducing digital data having been changed by said data change step.

11. An information processing method comprising:
    a storage step of storing tone reproducing digital data including information indicative of tone generating intensity levels and tone generating time lengths of notes to be sounded;
    a readout step of, in response to a readout instruction, reading out the tone reproducing digital data stored by said storage step;
    a note extraction step of extracting, from among the tone reproducing digital data read out by said readout step, notes meeting a predetermined condition regarding either or both of the tone generating intensity level and tone generating time length;
    a data change step of deleting the notes extracted by said note extraction step; and
    an output step of reproducing or outputting, to external equipment, the tone reproducing digital data having the extracted notes deleted therefrom by said data change step.

12. An information processing method comprising:
    a storage step of storing tone reproducing digital data including information indicative of tone generating intensity levels and tone generating time lengths of notes to be sounded;
    a readout step of, in response to a readout instruction, reading out the tone reproducing digital data stored by said storage step;
    a data change step of changing the tone reproducing digital data read out by said readout step, by adding new tone generating events to the digital data on the basis of a predetermined algorithm; and
    an output step of reproducing or outputting, to external equipment, the tone reproducing digital data having the new tone generating events added thereto by said data change step.

13. A program containing a group of instructions for causing a computer to perform an information processing method comprising:
    a storage step of storing tone reproducing digital data including information indicative of notes to be sounded and tone generating time lengths of the notes;
    a readout step of, in response to a readout instruction, reading out the tone reproducing digital data stored by said storage step;
    a note extraction step of extracting, from among the tone reproducing digital data read out by said readout step, notes meeting a predetermined condition;
    a data change step of changing the information indicative of the tone generating time lengths of the notes extracted by said note extraction step, to thereby perform a quantizing process on the notes; and
    an output step of reproducing or outputting, to external equipment, the tone reproducing digital data having been changed by said data change step.

14. A program containing a group of instructions for causing a computer to perform an information processing method comprising:
- a storage step of storing tone reproducing digital data including information indicative of notes to be sounded and a tone color of the notes;
- a readout step of, in response to a readout instruction, reading out the tone reproducing digital data stored by said storage step;
- a note extraction step of extracting, from among the tone reproducing digital data read out by said readout step, notes meeting a predetermined condition;
- a data change step of changing the information indicative of the tone color of the notes extracted by said note extraction step; and
- an output step of reproducing or outputting, to external equipment, the tone reproducing digital data having been changed by said data change step.

15. A program containing a group of instructions for causing a computer to perform an information processing method comprising:
- a storage step of storing tone reproducing digital data including information indicative of tone generating intensity levels and tone generating time lengths of notes to be sounded;
- a readout step of, in response to a readout instruction, reading out the tone reproducing digital data stored by said storage step;
- a note extraction step of extracting, from among the tone reproducing digital data read out by said readout step, notes meeting a predetermined condition regarding either or both of the tone generating intensity level and tone generating time length;
- a data change step of deleting the notes extracted by said note extraction step; and
- an output step of reproducing or outputting, to external equipment, the tone reproducing digital data having the extracted notes deleted therefrom by said data change step.

16. A program containing a group of instructions for causing a computer to perform an information processing method comprising:
- a storage step of storing tone reproducing digital data including information indicative of tone generating intensity levels and tone generating time lengths of notes to be sounded;
- a readout step of, in response to a readout instruction, reading out the tone reproducing digital data stored by said storage step;
- a data change step of changing the tone reproducing digital data read out by said readout step, by adding new tone generating events to the digital data on the basis of a predetermined algorithm; and
- an output step of reproducing or outputting, to external equipment, the tone reproducing digital data having the new tone generating events added thereto by said data change step.

17. An information processing method for use in an information communication network including a server of a data provider and a user terminal that receives tone reproducing digital data from said server, the method comprising:
- a step of storing payment information indicative of payment that have been made by a particular user terminal for tone reproducing digital data;
- a step of receiving, from said particular user terminal, a request for supply of tone reproducing digital data;
- a step of reading out the tone reproducing digital data designated by the request for supply received by said step of receiving;
- a step of reading out the stored payment information of said particular user terminal in response to the request;
- a step of, on the basis of the read-out payment information determining whether or not a change process should be performed on the read-out tone reproducing digital data and determining the degree of chance to be made by said change process to the read-out tone reproducing digital data;
- a step of, when it is determined that the change process should be performed, performing the change process on the read-out tone reproducing digital data in accordance with the determined degree of change, and outputting the tone reproducing digital data having been subjected to the change process, wherein said step of performing includes extracting notes meeting a predetermined condition from the read-out tone reproducing digital data and performing the change process on the extracted notes; and
- a step of transmitting the output tone reproducing digital data.

18. An information processing method for use in an information communication network including a server of a data provider and a user terminal that receives tone reproducing digital data from said server, the method comprising:
- a step of storing payment information indicative of payment that have been made by a particular user terminal for tone reproducing digital data and storing reproduction restriction information corresponding to the payment information of the particular user terminal;
- a step of receiving, from said particular user terminal, a request for supply of tone reproducing digital data;
- a step of reading out the tone reproducing digital data designated by the request for supply received by said step of receiving;
- a step of reading out the stored reproduction restriction information of said particular user terminal in response to the request;
- a step of adding, to the tone reproducing digital data read out by said step of reading out, the read-out reproduction restriction information corresponding to the payment information;
- a step of outputting the tone reproducing digital data having said reproduction restriction information added thereto;
- a step of transmitting the output tone reproducing digital data to said particular user terminal;
- a step of receiving the tone reproducing digital data transmitted by said server by said particular user terminal;
- a step of storing the tone reproducing digital data received by said particular user terminal;
- a step of detecting the request made by said particular user terminal for readout of tone reproducing digital data;
- a step of reading out the tone reproducing digital data designated by the request detected by said step of detecting;
- a step of, on the basis of the reproduction restriction information that have been added to the tone reproducing digital data read out, determining whether or not a change process should be performed on the read-out tone reproducing digital data and determining the degree of change to be made by said change process to the read-out tone reproducing digital data; and a step of, when it is determined that the change process should be performed, performing the change process by said particular user terminal on the read-out tone reproducing digital data in accordance with the determined degree of change, wherein the step of performing includes extracting notes meeting a predetermined condition from the read-out tone reproducing digital data and performing said change process on the extracted notes; and a step of outputting the tone reproducing digital data having been subjected to the change process.

19. The information processing method according to claim 17, wherein the change process to the read-out tone reproducing digital data include changing any one of a tone generating time length, tone color, or tone generating intensity.

20. The information processing method according to claim 18, wherein the change process to the read-out tone reproducing digital data include changing any one of a tone generating time length, tone color, or tone generating intensity.

* * * * *